(12) United States Patent
Bolnick et al.

(10) Patent No.: US 6,945,400 B2
(45) Date of Patent: Sep. 20, 2005

(54) CHILD RESISTANT SENIOR FRIENDLY MEDICAMENT LABEL

(75) Inventors: Martin M. Bolnick, Boca Raton, FL (US); Richard S. Bolnick, Roslyn Heights, NY (US)

(73) Assignee: Sticky Business, LLC, Roslyn Heights, NY (US)

( * ) Notice: Subject to any disclaimer, the term of this patent is extended or adjusted under 35 U.S.C. 154(b) by 237 days.

(21) Appl. No.: 10/392,146

(22) Filed: Mar. 18, 2003

(65) Prior Publication Data

US 2003/0209460 A1 Nov. 13, 2003

Related U.S. Application Data

(63) Continuation-in-part of application No. 10/100,610, filed on Mar. 18, 2002, now Pat. No. 6,598,745, which is a continuation-in-part of application No. 09/691,434, filed on Oct. 18, 2000, now Pat. No. 6,357,593.

(51) Int. Cl.[7] .................. B65D 83/04; B65D 85/42
(52) U.S. Cl. ............................ 206/531; 206/532
(58) Field of Search ............ 40/630, 638; 53/411; 206/232, 459.5, 461, 469, 484, 528, 531, 532, 534, 538, 539; 428/40.1, 41.7, 41.8, 42.2, 42.3

(56) References Cited

U.S. PATENT DOCUMENTS

| | | | | |
|---|---|---|---|---|
| 3,835,995 A | * | 9/1974 | Haines | 206/532 |
| 3,899,080 A | * | 8/1975 | Brunda | 206/531 |
| 3,905,479 A | * | 9/1975 | Gerner et al. | 206/531 |
| 3,912,081 A | * | 10/1975 | Haines et al. | 206/531 |
| 4,158,411 A | * | 6/1979 | Hall et al. | 206/531 |
| 4,211,329 A | * | 7/1980 | Braverman | 206/534 |
| 4,248,919 A | * | 2/1981 | Davis | 428/40.1 |
| 4,260,061 A | * | 4/1981 | Jacobs | 383/211 |
| 5,014,851 A | * | 5/1991 | Wick | 206/539 |
| 5,046,618 A | * | 9/1991 | Wood | 206/532 |
| 5,078,427 A | * | 1/1992 | Ishii et al. | 428/41.8 |
| 5,172,812 A | * | 12/1992 | Wharton et al. | 206/531 |
| 5,290,616 A | * | 3/1994 | Cowan et al. | 428/41.8 |
| 5,339,960 A | * | 8/1994 | Price | 206/531 |
| 5,613,349 A | * | 3/1997 | Brown | 53/411 |
| 5,766,716 A | * | 6/1998 | Barry | 428/40.1 |
| 6,006,913 A | * | 12/1999 | Ludemann et al. | 206/531 |
| 6,027,598 A | * | 2/2000 | Anderson | 40/630 |
| 6,027,780 A | * | 2/2000 | Treleaven et al. | 428/40.1 |
| 6,037,029 A | * | 3/2000 | Instance | 428/40.1 |
| 6,155,423 A | * | 12/2000 | Katzner et al. | 206/531 |
| 6,161,699 A | * | 12/2000 | Gartland | 206/531 |
| 6,637,596 B1 | * | 10/2003 | Ito et al. | 206/539 |

* cited by examiner

Primary Examiner—Jim Foster
(74) Attorney, Agent, or Firm—Kenyon & Kenyon

(57) ABSTRACT

A blister card label form has a first sheet having first and second major surfaces. The first sheet is provided with removable portions and a permanent adhesive directly applied on its second major surface and a temporary adhesive directly applied on its second major surface. This permits portions of the label to be permanently attached to a blister package and also permits portions of the first sheet to be selectively removed.

26 Claims, 21 Drawing Sheets

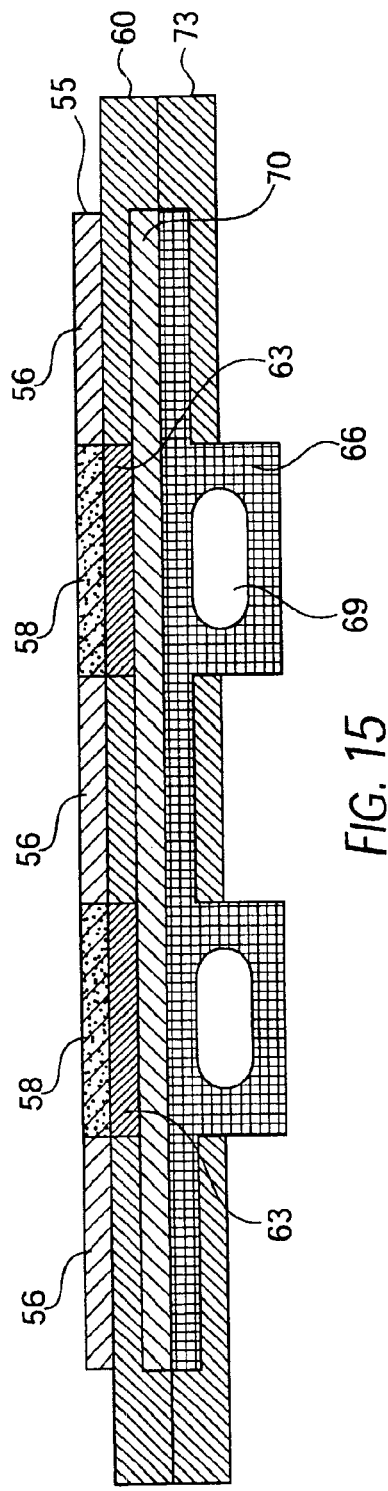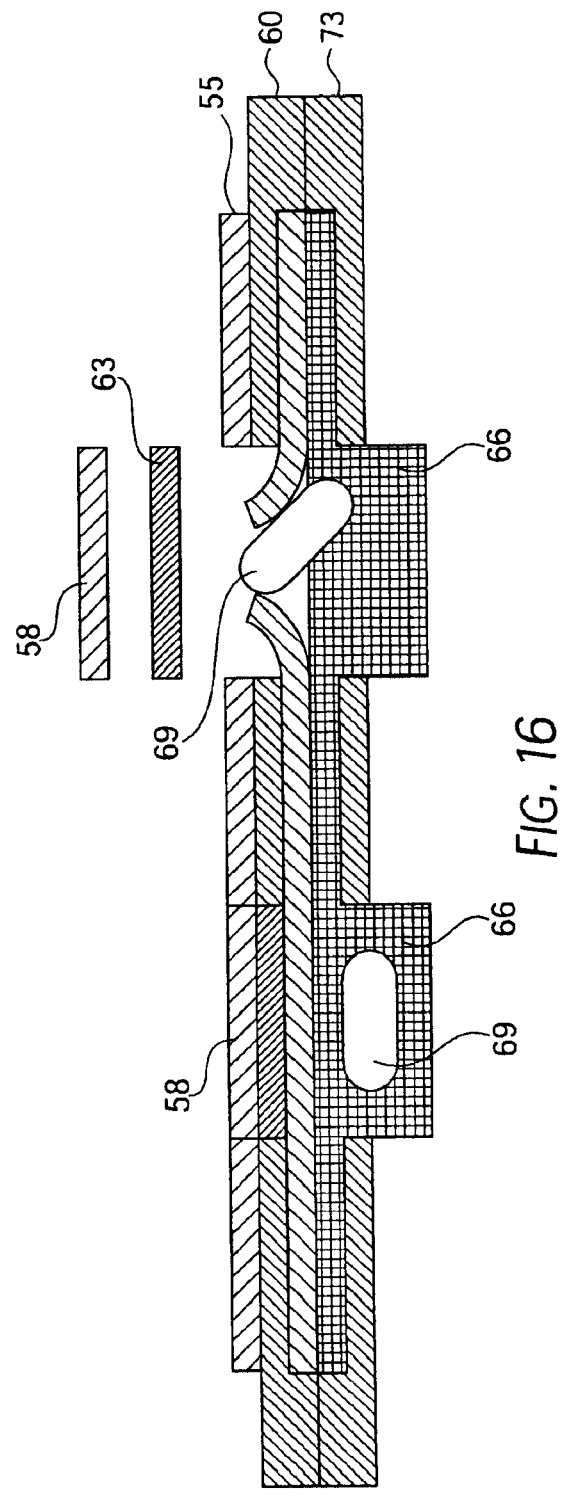
FIG. 15
FIG. 16

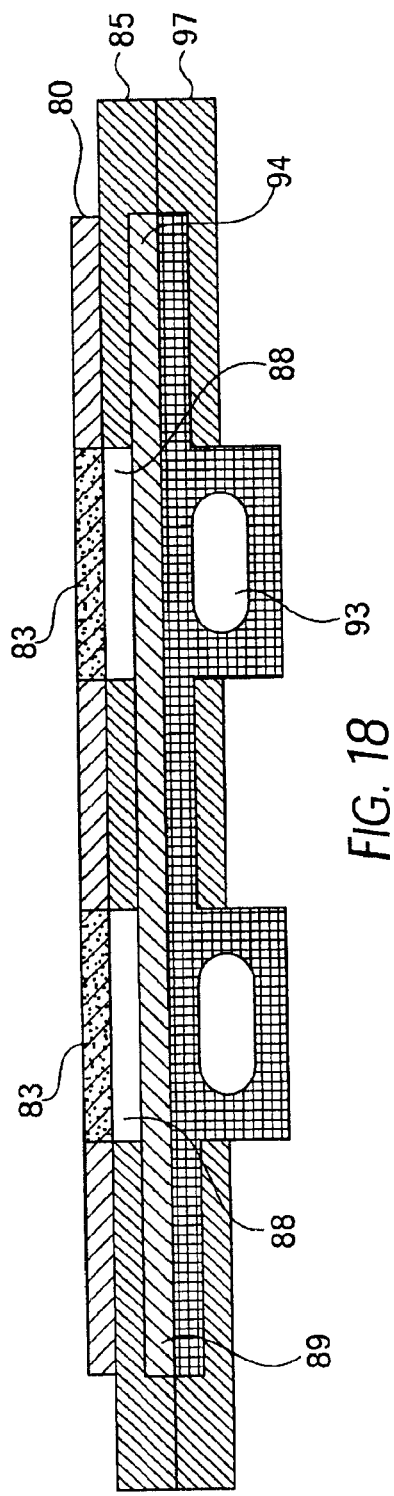
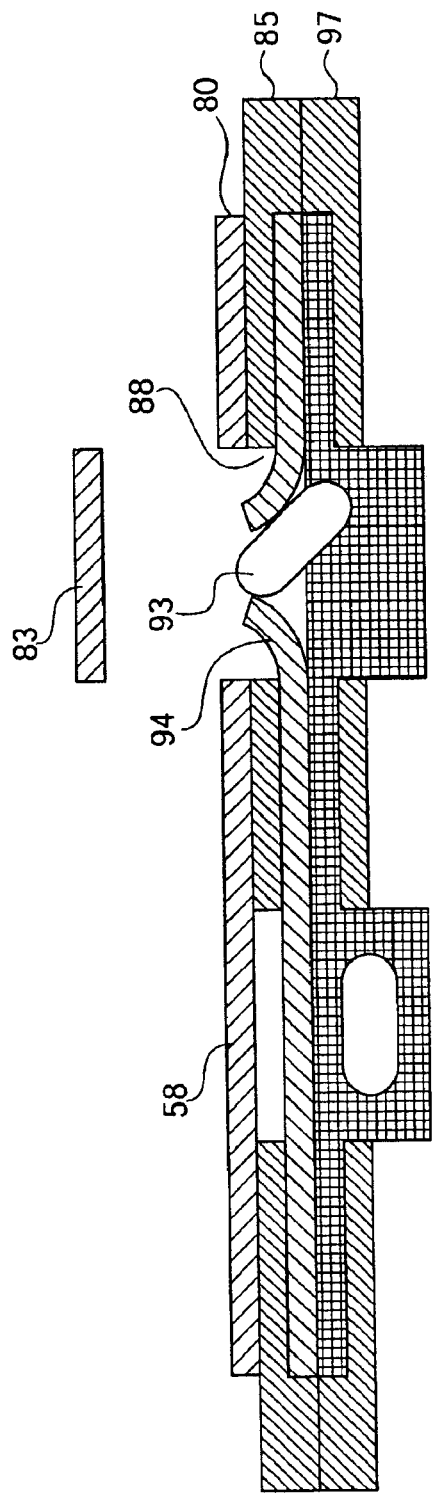

CHILD RESISTANT SENIOR FRIENDLY MEDICAMENT LABEL

This application is a continuation in part of application Ser. No. 10/100,610 filed Mar. 18, 2002, now U.S. Pat. No. 6,598,745 which is a continuation in part of application Ser. No. 09/691,434 filed Oct. 18, 2000 now U.S. Pat. No. 6,357,593.

FIELD OF THE INVENTION

The present invention relates to label forms for blister cards and more particularly to label forms for blister cards that are child resistant and senior friendly.

BACKGROUND

Conventional blister cards often utilize a retaining label, such as paper, or foil, to retain a medicament in the medicament compartment or "blister" of a blister card. When the user wishes to use the medicament, the medicament is pushed through the retaining label. One shortcoming of this conventional blister card packaging is that a child may tamper with the package and release the medicament. One approach to making conventional blister cards resistant to tampering by children is to increase the thickness of the label so that more strength is required to push the medicament through the sheet. Another approach is to vary the composition of the material utilized to make the sheet so that the sheet is more resistant to puncture. Still another approach is to utilize multiple sheets so that it is more difficult for a child to push the medicament through the retaining sheet. One major shortcoming of all of these approaches is that they are not senior friendly, i.e., as the blister card becomes more resistant to tampering by children, it becomes more difficult for the elderly or the infirm to remove the medicament when needed. This is especially important for patients with arthritis or patients who may have the use of only one hand. Accordingly, there exists a need for a blister card that is both resistant to tampering by children and that will also permit a senior to easily release the medicament from the blister card when needed.

SUMMARY OF THE INVENTION

In accordance with an exemplary embodiment of the present invention, it is an object of this invention to provide a child resistant/senior friendly blister card, comprising a first sheet having a first major surface and a second major surface and a plurality of selectively removable portions. The second major surface provided with a temporary adhesive, a second sheet has a first major surface and a second major surface and a plurality of removable portions. The first major surface of the second sheet is attached to the second major surface of the first sheet. The second major surface of the second sheet provided with a permanent adhesive. A blister card has a plurality of medicament compartments with each of the plurality of compartments having a closed bottom end and an open top end for receiving a medicament. A medicament containment sheet has a first major surface and a second major surface, and the second major surface of the containment sheet is attached to the blister card. The first major surface of the containment sheet is attached to the permanent adhesive on the second major surface of the second sheet. The removable portions of the first sheet are in registry with the open top ends of the medicament compartments. The temporary adhesive on the second major surface of the first sheet has an adhesive strength that is sufficient to adhere the first sheet to the first major surface of the second sheet and an adhesive strength that allows the selectively removable portions of the first sheet to be removed from the second sheet without removing the selectively removable portions of the second sheet to which the first sheet is attached.

It is another object of this invention to provide a child resistant/senior friendly blister card, comprising a child resistant/senior friendly blister card, comprising a first sheet having a first major surface and a second major surface and a plurality of selectively removable portions. The second major surface is provided with a temporary adhesive. A second sheet has a first major surface and a second major surface and provided with a plurality of apertures, the first major surface of the second sheet is attached to the second major surface of the first sheet and the second major surface of the second sheet provided with a permanent adhesive. A blister card has a plurality of medicament compartments with each of the plurality of compartments having a closed bottom end and an open top end for receiving a medicament. A medicament containment sheet has a first major surface and a second major surface. The second major surface of the containment sheet is attached to the blister card and the first major surface of the containment sheet is attached to the permanent adhesive on the second major surface of the second sheet. The removable portions of the first sheet are in registry with the open top ends of the medicament compartments and also in registry with the apertures in the second sheet. The temporary adhesive on the second major surface of the first sheet has an adhesive strength that is sufficient to adhere the first sheet to the first major surface of the second sheet and adhere the first sheet to the first major surface of the medicament containment sheet, and an adhesive strength that allows the selectively removable portions in the first sheet to be removed without removing the portions of the medicament containment sheet covering the open top end of the medicament compartment to which the first sheet is attached.

BRIEF DESCRIPTION OF THE DRAWINGS

FIG. 15 shows the components of FIG. 14 after they have been assembled;

FIG. 16 shows a medicament being dispensed from the blister card of FIG. 15;

FIG. 18 shows the components of FIG. 17 after they have been assembled;

FIG. 19 shows a medicament being dispensed from the blister card of FIG. 18;

DETAILED DESCRIPTION OF THE INVENTION

Figure 1:
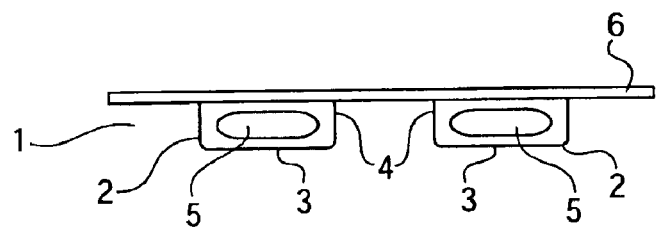
FIG. 1 shows a conventional blister card containing a medicament.
Figure 2:
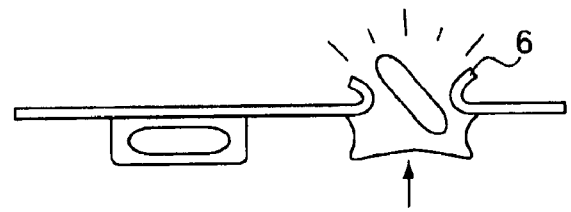
FIG. 2 shows the medicament shown in FIG. 1 being dispensed.

FIG. 1 is a side view of a conventional blister card package 1. The blister card 1 is provided with a plurality of medicament compartments, or pockets 2, having a closed bottom end 3 and an open top end 4 for receiving and storing a medicament 5. A medicament retaining sheet 6 is permanently attached to the blister card 1 and covers the open top end 4 of the medicament compartment 2 so that the medicament 5 is retained in the medicament compartment until required. When the user desires to dispense the medicament 5, the retaining sheet 6 is either cut or punctured to release the medicament 5. This is often accomplished by simply using a thumb or finger to apply pressure to the closed bottom end 3 of the medicament compartment 2 and pushing the medicament 5 through the retaining sheet 6 as shown in FIG. 2. The thickness of the retaining sheet 6 and the material utilized to make the retaining sheet 6 may be varied to vary the degree of pressure or strength required to puncture the retaining sheet.

Figure 3:
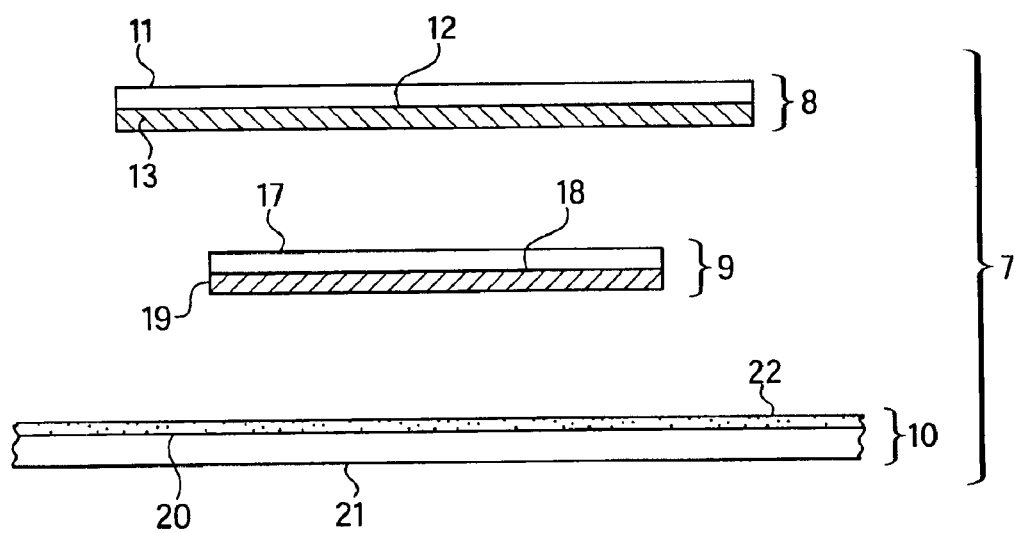
FIG. 3 is an exploded view of a label form constructed in accordance with the invention.

FIG. 3 is an exploded view of a label form 7 for a child resistant/senior friendly blister card constructed in accordance with the invention and shows a first sheet 8, a second sheet 9, and a carrying sheet 10.

Figure 4:
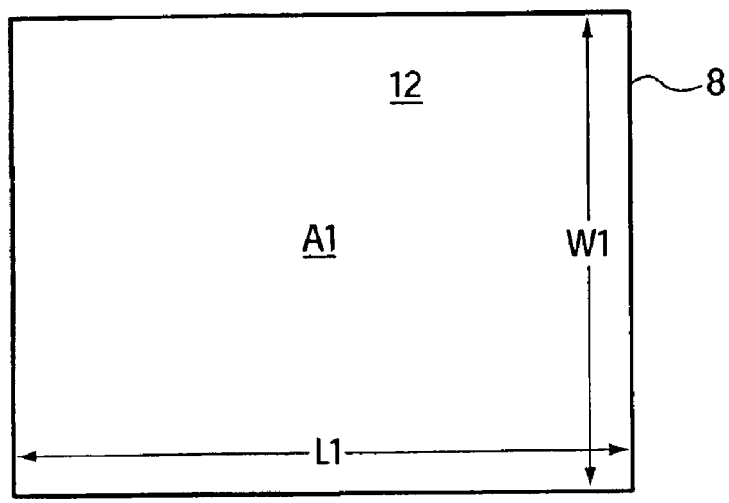
FIG. 4 shows a major surface of a first sheet constructed in accordance with the invention.
Figure 8:
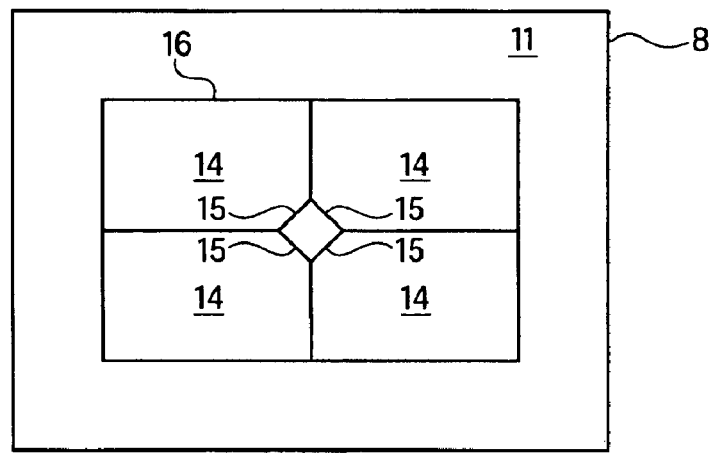
FIG. 8 shows the first major surface of a first sheet constructed in accordance with the invention.

The first sheet 8 has a first major surface 11 and a second major surface 12. The first sheet 8 is preferably comprised of paper or a synthetic material. A permanent adhesive 13 is attached to the second major surface 12 of the first sheet 8. FIG. 4 is a view of the second major surface 12 of the first sheet 8 and shows that the first sheet 8 has a first length $L_1$ and a first width $W_1$ defining a first area $A_1$. FIG. 8 shows the first major surface 11 of the first sheet 8 and shows that the first sheet 8 is provided with a plurality of removable portions 14 that are selectively removable. Facilitation notches 15 may be provided to facilitate the selective removal of the removable portions 14. Perforations, cuts, or scoring 16 may also be provided in the first sheet 8 to facilitate the removal of each of the removable portions 14.

Figure 5:
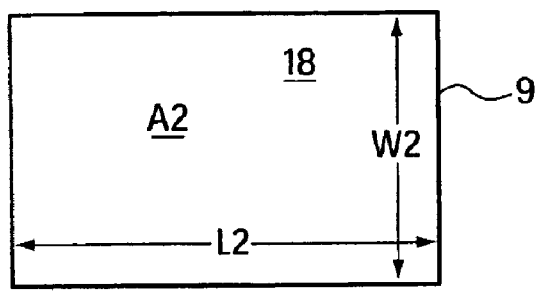
FIG. 5 shows a major surface of a second sheet constructed in accordance with the invention.

As shown in FIG. 3, the second sheet 9 has a first major surface 17 and a second major surface 18. The second sheet 9 is preferably comprised of a synthetic material. A removable or temporary adhesive 19 is applied to the second major surface 18 of the second sheet 9. FIG. 5 is a view of the second major surface 18 of the second sheet 9 and shows that the second sheet 9 has a second length $L_2$ and a second width $W_2$ defining a second area $A_2$ that is smaller than $A_1$.

Figure 6:
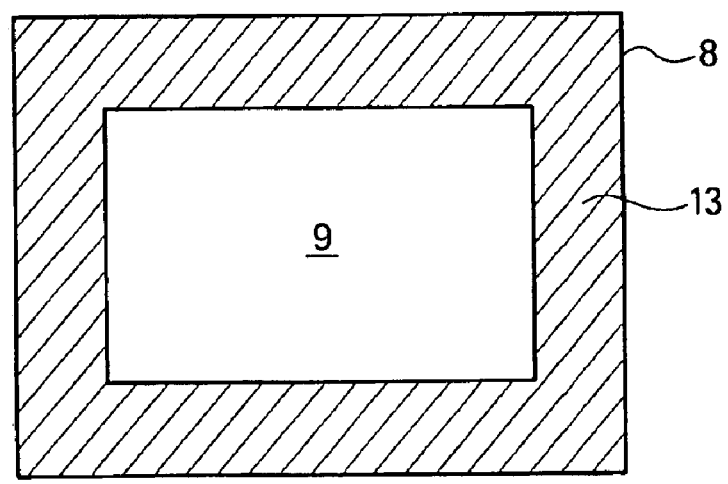
FIG. 6 shows the second sheet of FIG. 5 superimposed on the first sheet of FIG. 4.
Figure 7:
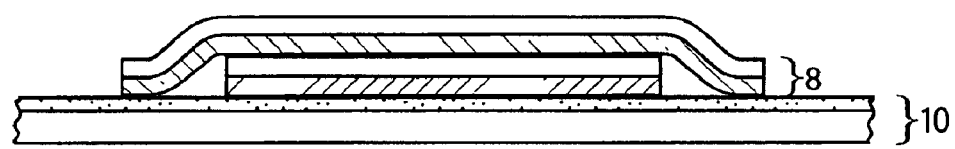
FIG. 7 shows the exploded view of the label form of FIG. 3 in the assembled configuration.

As shown in FIG. 3, the carrying sheet 10 has a first major surface 20 and a second major surface 21. The first major surface 20 of the carrying sheet 10 is provided with a non-stick surface 22. In a preferred embodiment, the non-stick coating is silicone. FIG. 7 shows the exploded label set of FIG. 3 as it appears when assembled. When assembled, the first major surface 17 of the second sheet 9 is attached to the permanent adhesive 13 on the second surface 12 of the first sheet 8. The removable adhesive 19 disposed on the second major surface 18 of the second sheet 9 is attached to the non-stick surface 22 disposed on the first major surface 20 of the carrying sheet 10. The second sheet 9 is disposed within $A_1$ of the first sheet 8 so that a portion of the permanent adhesive 13 on the second major surface 12 of the first sheet borders or surrounds the second sheet 9 as shown in FIG. 6. The removable portions 14 of the first sheet 8 are disposed within the second area $A_2$ defined by $L_2$ and $W_2$ of the second sheet as shown in FIG. 8.

Figure 9:
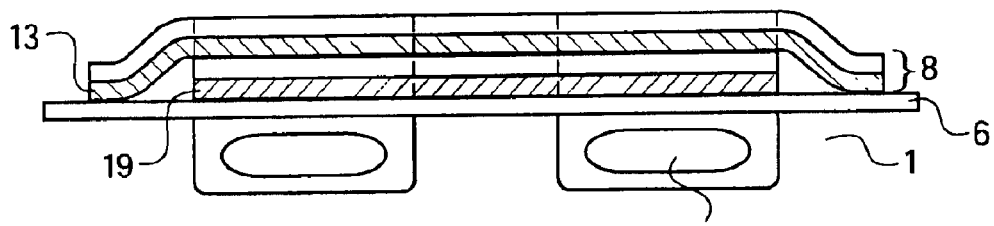
FIG. 9 shows a label form and blister card constructed in accordance with the invention.
Figure 10:
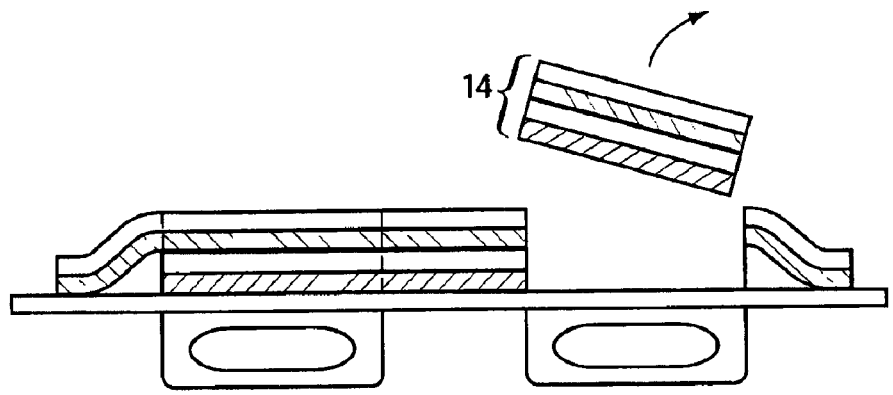
FIG. 10 shows the label form of FIG. 9 with a removable portion removed.

In operation, the label form shown in FIG. 7 is removed from the carrying sheet 10 and is applied to a blister card 1 as shown in FIG. 9. FIG. 9 shows a blister card 1 containing a medicament 5. The medicament 5 is held in place by a medicament retaining sheet 6. The label form is removed from the carrying sheet 10 and is attached to the medicament retaining sheet 6. The portion of the permanent adhesive 13 that surrounds the second sheet 9 permanently adheres the label form to the medicament retaining sheet 6. The removable portions 14 of the first sheet 8 are in registry with the medicament compartments 2 of the blister card 1. When the label form is applied to the blister card 1 the blister card 1 is resistant to tampering by children because the medicament retaining sheet 6, the second sheet 9, and the first sheet 8 cooperate to provide greater resistance to a child attempting to push the medicament 5 through the three layers 8, 9, and 6. Although resistant to tampering by children, the blister card 1 is also senior friendly because an adult would first remove the removable portion 14 of the first sheet 8 as shown in FIG. 10. Removing the removable portion 14 of the first sheet 8 also removes the portion of the second sheet 9 that is permanently attached to the permanent adhesive 13 on the second major surface 12 of the first sheet 8. Thus, only the medicament retaining sheet 6 prevents the medicament 5 from being removed from the medicament compartment 2 as shown in FIG. 10. The user then pushes the medicament 5 through the medicament retaining sheet 6 as shown in FIG. 11 and as previously discussed.

Figure 11:
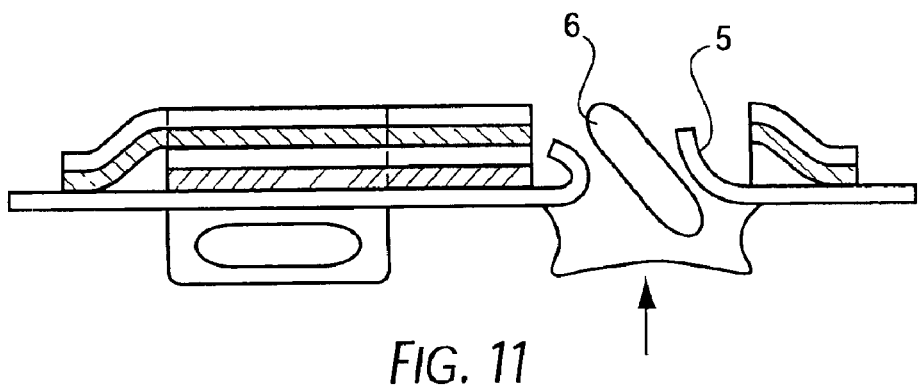
FIG. 11 shows how the medicament shown in FIG. 10 is dispensed.
Figure 12:
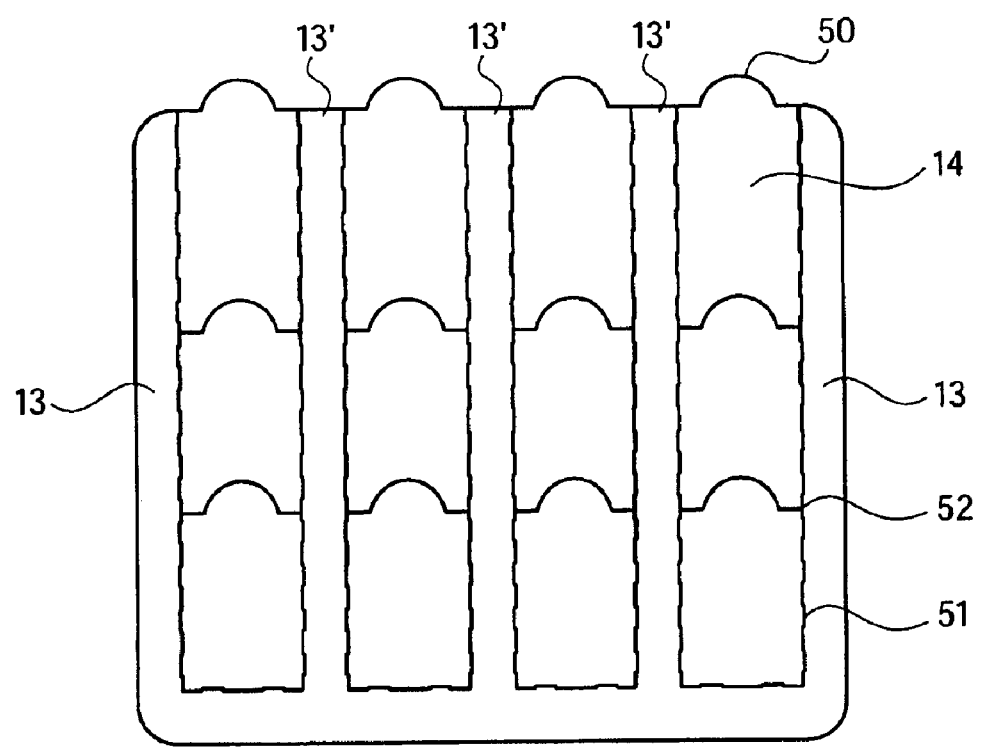
FIG. 12 is a top view of another embodiment of the invention.
Figure 13:
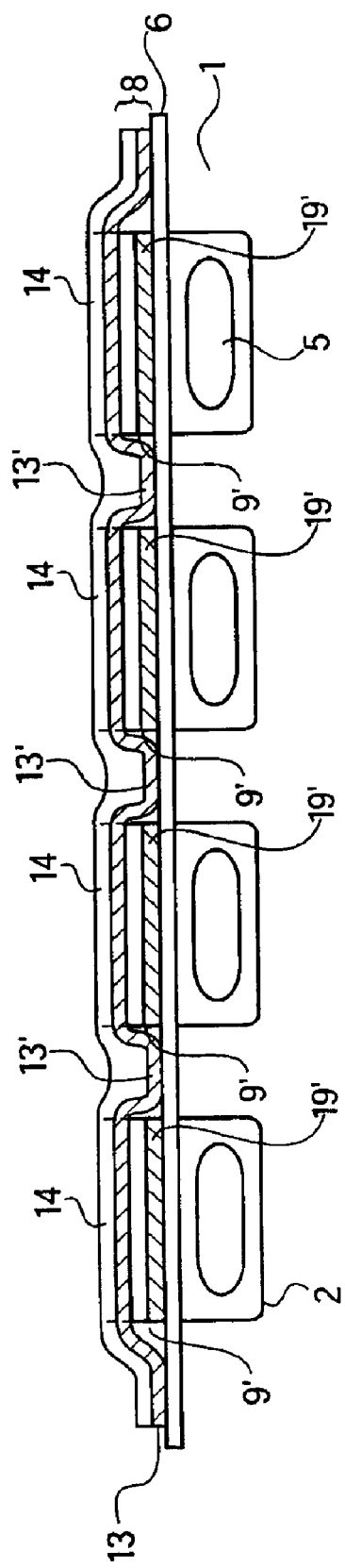
FIG. 13 is a side view of the invention shown in FIG. 12 applied to a blister card.

In the embodiment shown in FIGS. 11 and 12, the second sheet is not a continuous sheet as disclosed in FIGS. 3 to 11. Instead, a plurality of discrete second sheets 9' are disposed as discrete portions or strips. This permits the portions 13' of the permanent adhesive 13 attached to the first sheet 8, and disposed between the plurality of second sheets 9', and thus disposed between the removable portions 14 of the first sheet 8, to come in direct contact with and permanently adhere to the medicament retaining sheet 6 permanently attached to the blister card 1 as shown in FIG. 12.

Figure 14:
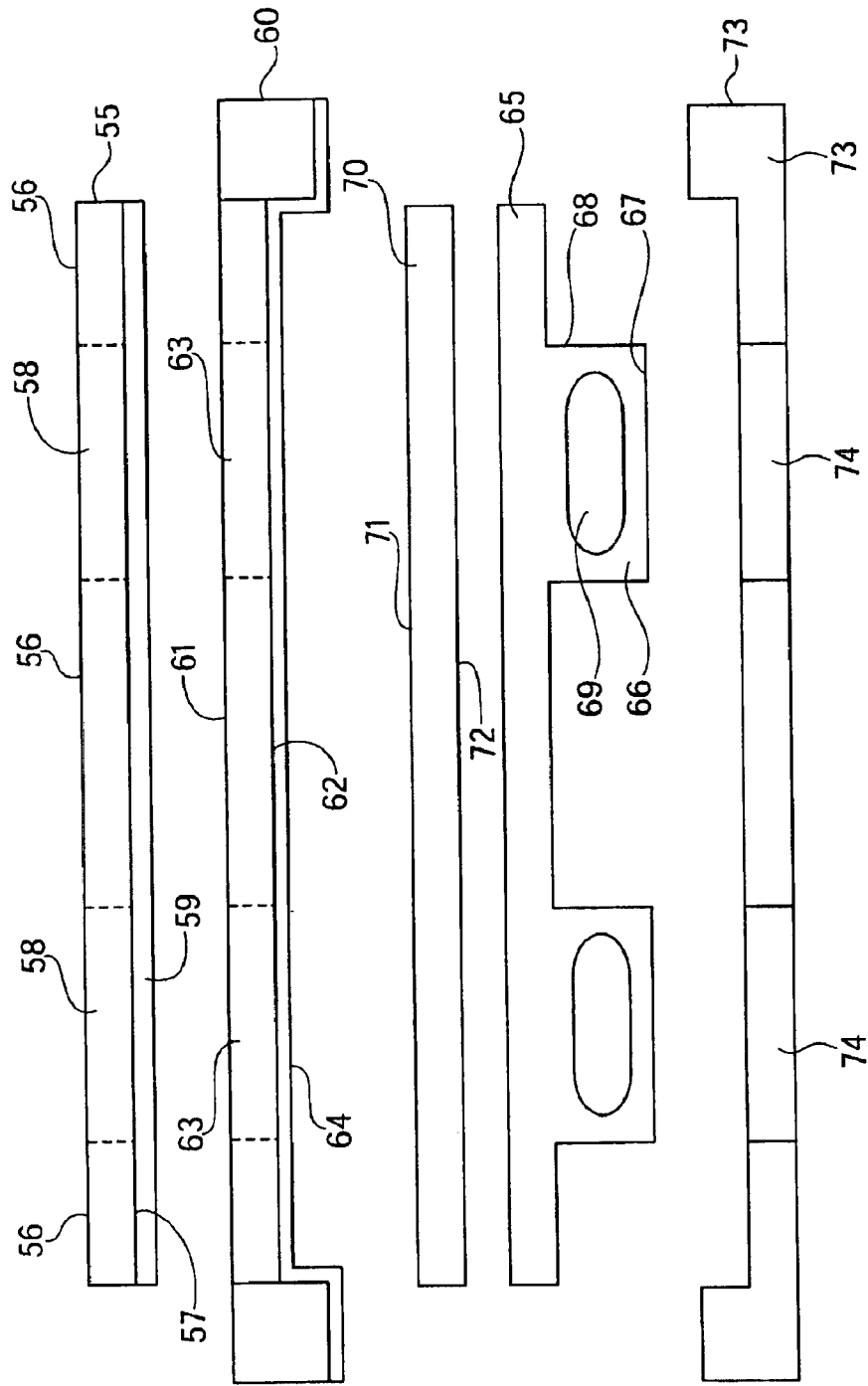
FIG. 14 is an exploded view of an alternative embodiment of a child resistant blister card constructed in accordance with Applicant's invention.

The permanent adhesive 13' disposed between the second sheets 19' has the effect of isolating each removable label 14 so that pulling on the tab of each label will remove only one label at a time. In addition, in this embodiment each removable portion 14 is provided with a tab 50 to facilitate selective removal of each of the removable portions 14. Each removable portion 14 may also be provided with means, e.g., perforations 51 and/or slits 52 cut into the removable portion 14 to facilitate selective removal of each removable portion 14 and to help isolate each removable portion 14 to permit selective removal of each removable portion 14 without inadvertently removing any other removable portion 14. FIG. 12 shows a blister card 1 containing a medicament 5. The medicament 5 is held in place by a medicament retaining sheet 6. The label form is removed from the carrying sheet 10 and is attached to the medicament retaining sheet 6. The portion of the permanent adhesive 13 that surrounds or borders the first sheet permanently adheres the border of the label form to the medicament retaining sheet 6. The removable portions 14 of the first sheet 8 are in registry with the medicament compartments 2 of the blister card 1. Each of the plurality of second sheets 9' is in registry with the removable portions 14 of the first sheet 8. When the label form is applied to the blister card 1, the blister card 1 is resistant to tampering by children because the medicament retaining sheet 6, the second sheets 9', and the first sheet 8 cooperate to provide greater resistance to a child attempting to push the medicament 5 through the three layers 8, 9', and 6. Although resistant to tampering by children, the blister card 1 is also senior friendly because an adult would first remove the removable portion 14 of the first sheet 8 as shown in FIG. 10. Removing the removable portion 14 of the first sheet 8 also removes the portions of the second sheets 9' that are permanently attached to the permanent adhesive 13 on the second major surface 12 of the first sheet 8. Thus, only the medicament retaining sheet 6 prevents the medicament 5 from being removed from the medicament compartment 2 as shown in FIG. 10 and as previously discussed. The user then pushes the medicament 5 through the medicament retaining sheet 6 as shown in FIG. 11 and as previously discussed. FIGS. 14 to 16 show another embodiment of Applicant's invention. FIG. 14 is an exploded view of a child resistant/senior friendly blister card, comprising a first sheet 55 having a first major surface 56 and a second major surface 57 and a plurality of selectively removable portions 58. The second major surface 57 is provided with a temporary adhesive 59. A second sheet 60 has a first major surface 61 and a second major surface 62 and a plurality of removable portions 63. The first major surface 61 of the second sheet 60 is attached to the second major surface 57 of the first sheet 55. The second major surface 62 of the second sheet 60 is provided with a permanent adhesive 64. A blister package 65 has a plurality of medicament compartments 66 with each of the plurality of compartments 66 having a closed bottom end 67 and an open top end 68 for receiving a medicament 69. A medicament containment sheet 70 has a first major surface 71 and a second major surface 72. The second major surface 72 of the containment sheet 70 is attached to the blister card 65 and the first major surface 71 of the containment sheet 70 is attached to the permanent adhesive 64 on the second major surface 62 of the second sheet 60. The removable portions 58 of the first sheet 55 are in registry with the open top ends 68 of the medicament compartments 66. The temporary adhesive 59 on the second major surface 57 of the first sheet 55 has an adhesive strength that is sufficient to adhere the first sheet 55 to the first major surface 61 of the second sheet 60 and an adhesive strength that allows the selectively removable portions 58 of the first sheet 55 to be removed from the second sheet 60 without removing the selectively removable portions 63 of the second sheet 60 to which the first sheet 55 is attached.

Figure 17:
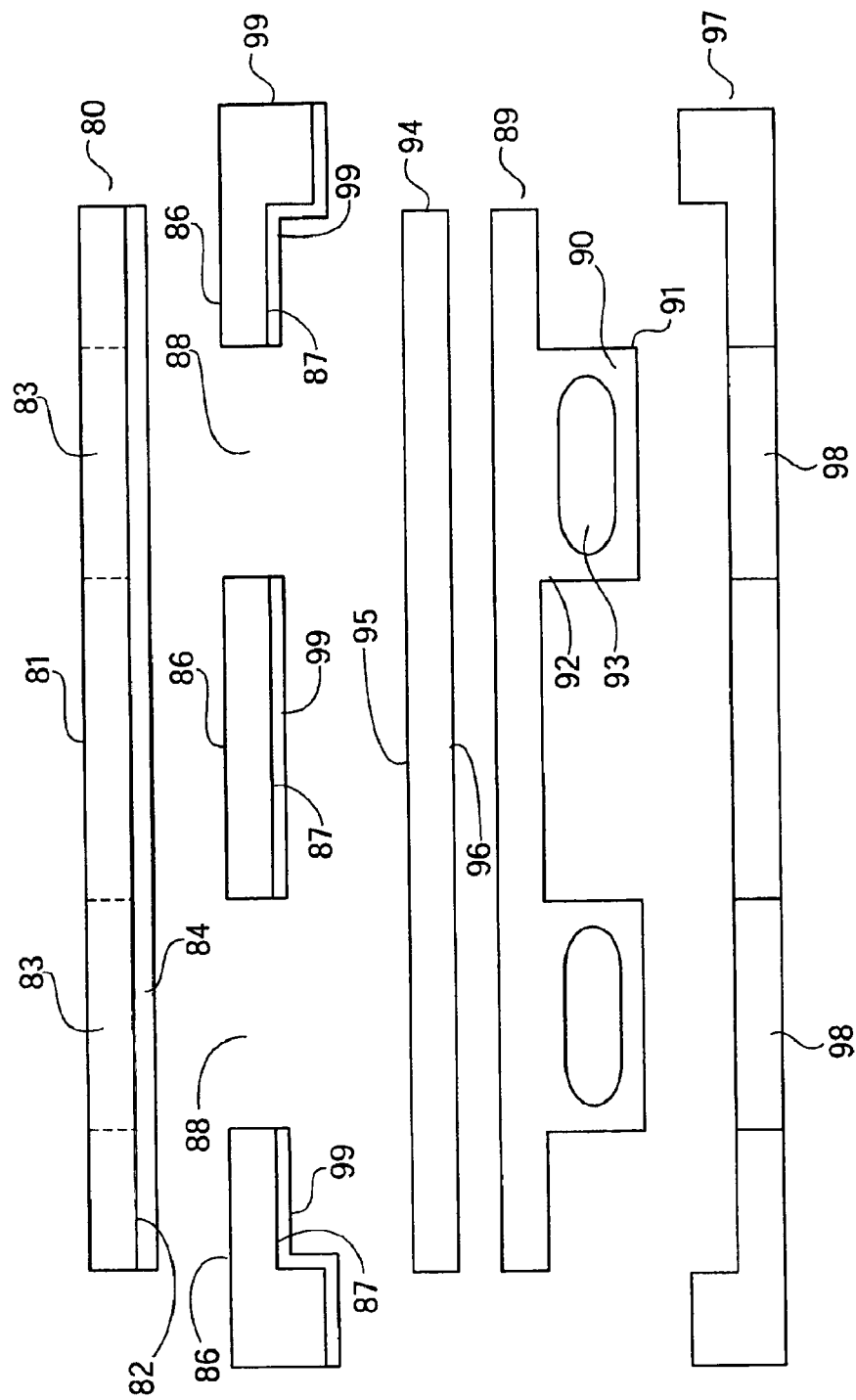
FIG. 17 is an exploded view of an alternative embodiment of a child resistant blister card constructed in accordance with Applicant's invention.

In a preferred embodiment, a third sheet 73 may be provided to impart stability. The third sheet 73 is provided with a plurality of apertures 74 sized and aligned to receive the medicament compartments 66. The second sheet 60 and third sheet 73 may be two separate sheets as shown in FIG. 14. Alternatively, the second sheet 60 and the third sheet 73 may be hingedly connected in a clam shell configuration. FIG. 15 shows the components of FIG. 15 after they have been assembled. FIG. 16 shows a medicament being dispensed from the assembled blister card of FIG. 15. In a preferred embodiment, the first sheet is comprised of paper or a synthetic material. The second sheet is preferably a synthetic material. The blister card may also be provided with means to facilitate selective removal of the removable portions of the first sheet (e.g., a tab attached to each removable portion). In a preferred embodiment the means is selected from the group consisting of slits, notches, and perforations. The medicament containing sheet may be transparent or opaque and in a preferred embodiment is comprised of a metal foil. FIGS. 17 to 19 to show yet another embodiment of a child resistant/senior friendly blister card constructed in accordance with the invention. FIG. 17 is an exploded view and shows a first sheet 80 having a first major surface 81 and a second major surface 82 and a plurality of selectively removable portions 83. The second major surface 82 is provided with a temporary adhesive 84. A second sheet 85 has a first major surface 86 and a second major surface 87 and is provided with a plurality of apertures 88. The first major surface 86 of the second sheet 85 is attached to the second major surface 82 of the first sheet 80. The second major surface 87 of the second sheet 85 is provided with a permanent adhesive 99. A blister package 89 has a plurality of medicament compartments 90 with each of the plurality of compartments 90 having a closed bottom end 91 and an open top end 92 for receiving a medicament 93. A medicament containment sheet 94 has a first major surface 95 and a second major surface 96. The second major surface 96 of the containment sheet 94 is attached to the blister card 89 and the first major surface 95 of the containment sheet 94 is attached to the permanent adhesive 99 on the second major surface 87 of the second sheet 85. The removable portions 83 of the first sheet 80 are in registry with the open top ends 92 of the medicament compartments 90 and are also in registry with the apertures 88 in the second sheet 85. The temporary adhesive 84 on the second major surface 82 of the first sheet 80 has an adhesive strength that is sufficient to adhere the first sheet 80 to the first major surface 86 of the second sheet 85 and adhere the first sheet 80 to the first major surface 95 of the medicament containment sheet 94, and an adhesive strength that allows the selectively removable portions 83 in the first sheet 80 to be removed without removing the portions of the medicament containment sheet 94 covering the open top end 92 of the medicament compartment 90 to which the first sheet 80 is attached. In a preferred embodiment, a third sheet 97 may be provided to impart stability. The third sheet 97 is provided with a plurality of apertures 98 sized and aligned to receive the medicament compartments 90. The second sheet 85 and third sheet 97 may be two separate sheets as shown in FIG. 17. Alternatively, the second sheet 85 and the third sheet 97 may be hingedly connected in a clam shell configuration. FIG. 18 shows the components of FIG. 17 after they have been assembled. FIG. 19 shows a medicament 93 being dispensed from the assembled blister card of FIG. 18.

In a preferred embodiment, the first sheet is comprised of paper or a synthetic material. The second sheet is preferably a synthetic material. The blister card may also be provided with means to facilitate selective removal of the removable portions of the first sheet (e.g., a tab attached to each removable portion). In a preferred embodiment the means is selected from the group consisting of slits, notches, and perforations. The medicament containing sheet may be transparent or opaque and in a preferred embodiment is comprised of a metal foil.

Figure 20:
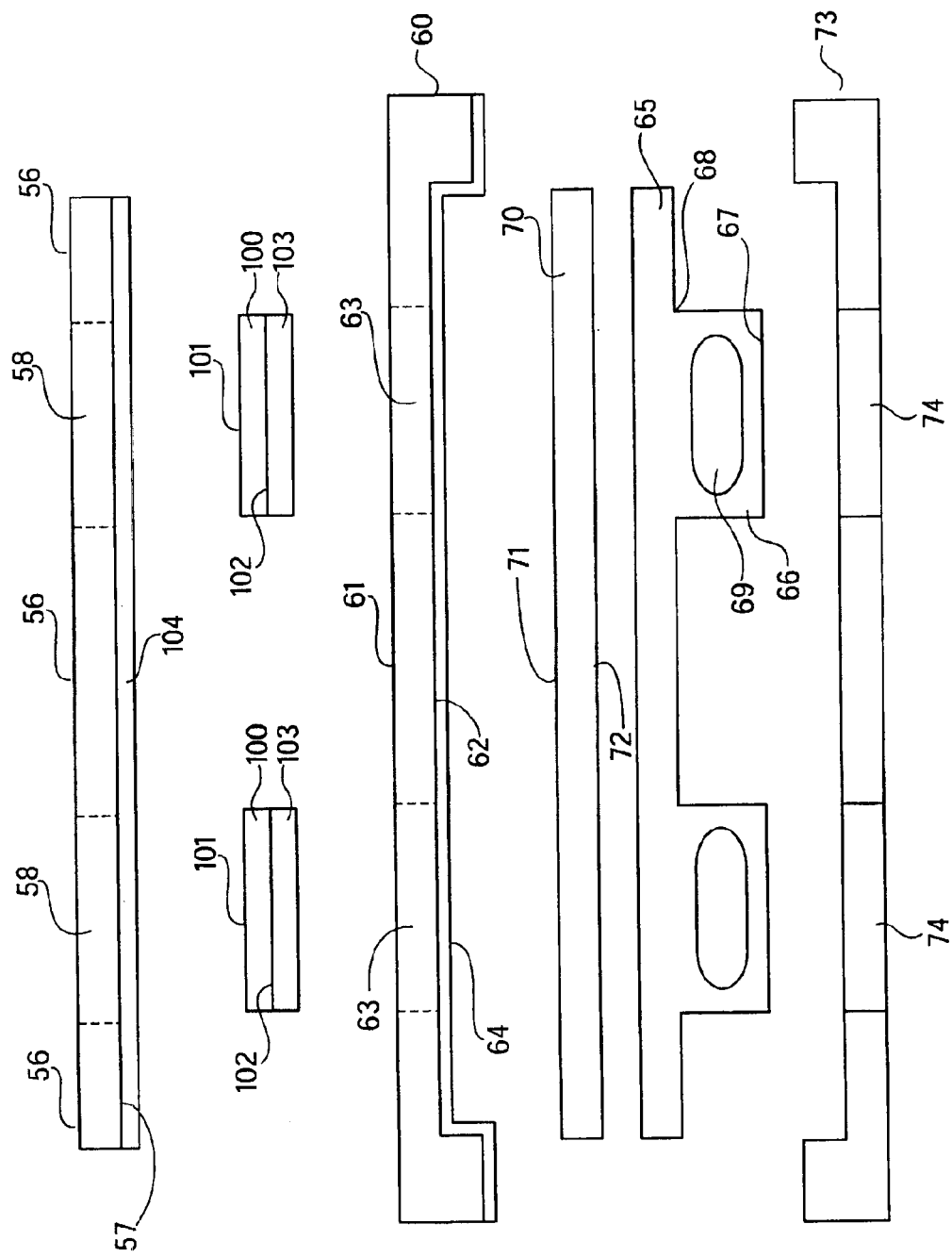
FIG. 20 shows an alternative embodiment of the invention shown in FIG. 14.

FIG. 20 shows an especially preferred alternative embodiment of the embodiment shown in FIG. 14 in which a film material 100, preferably clear, is disposed between the first sheet 55 and the second sheet 60. The film material 100, preferably a clear sheet, has a first major surface 101 and a second major surface 102. A removable adhesive 103 is applied to the second major surface 102 of the film material 100. In this embodiment, the second major surface 57 of the first sheet 55 is provided with a permanent adhesive 104. FIG. 20 is an exploded view of a child resistant/senior friendly blister card, comprising a first sheet 55 having a first major surface 56 and a second major surface 57 and a plurality of selectively removable portions 58. The second major surface 57 is provided with a permanent adhesive 104. A second sheet 60 has a first major surface 61 and a second major surface 62 and a plurality of removable portions 63. A film material 100 is disposed between the first sheet 55 and the second sheet 60. The film material 100, preferably a clear sheet, has a first major surface 101 and a second major surface 102. A removable adhesive 103 is applied to the second major surface 102 of the film material 100. In a preferred embodiment the film material 100 does not cover the entire second major surface 57 of the first sheet 55. In an especially preferred embodiment, the first and second major surfaces 101 and 102 of the film material 100 have an area that is smaller than the area of the second major surface 57 of the first sheet 55 and the sheet material 100 is sized and disposed so as to leave a border of uncovered permanent adhesive 104 around the border of the second major surface 57 of the first sheet 55. This permits a portion of the first sheet 55 to be permanently adhered to the first major surface 61 of the second sheet 60.

The first major surface 61 of the second sheet 60 is attached to the second major surface 102 of the film material 100. The second major surface 62 of the second sheet 60 is provided with a permanent adhesive 64. A blister package 65 has a plurality of medicament compartments 66 with each of the plurality of compartments 66 having a closed bottom end 67 and an open top end 68 for receiving a medicament 69. A medicament containment sheet 70 has a first major surface 71 and a second major surface 72. The second major surface 72 of the containment sheet 70 is attached to the blister card 65 and the first major surface 71 of the containment sheet 70 is attached to the permanent adhesive 64 on the second major surface 62 of the second sheet 60. The removable portions 58 of the first sheet 55 are in registry with the open top ends 68 of the medicament compartments 66. The temporary or removable adhesive 103 on the second major surface 102 of the film material 100 has an adhesive strength that is sufficient to adhere the first sheet 55 to the first major surface 61 of the second sheet 60 and an adhesive strength that allows the selectively removable portions 58 of the first sheet 55 to be removed from the second sheet 60 without removing the selectively removable portions 63 of the second sheet 60 to which the first sheet 55 is attached. In a preferred embodiment, a third sheet 73 may be provided to impart stability. The third sheet 73 is provided with a plurality of apertures 74 sized and aligned to receive the medicament compartments 66. The second sheet 60 and third sheet 73 may be two separate sheets as shown in FIG. 14. Alternatively, the second sheet 60 and the third sheet 73 may be hingedly connected in a clam shell configuration.

In a preferred embodiment, the first sheet is comprised of paper or a synthetic material. The second sheet is preferably a synthetic material. The blister card may also be provided with means to facilitate selective removal of the removable portions of the first sheet (e.g., a tab attached to each removable portion). In a preferred embodiment the means is selected from the group consisting of slits, notches, and perforations. The medicament containing sheet may be transparent or opaque and in a preferred embodiment is comprised of a metal foil.

Figure 21:
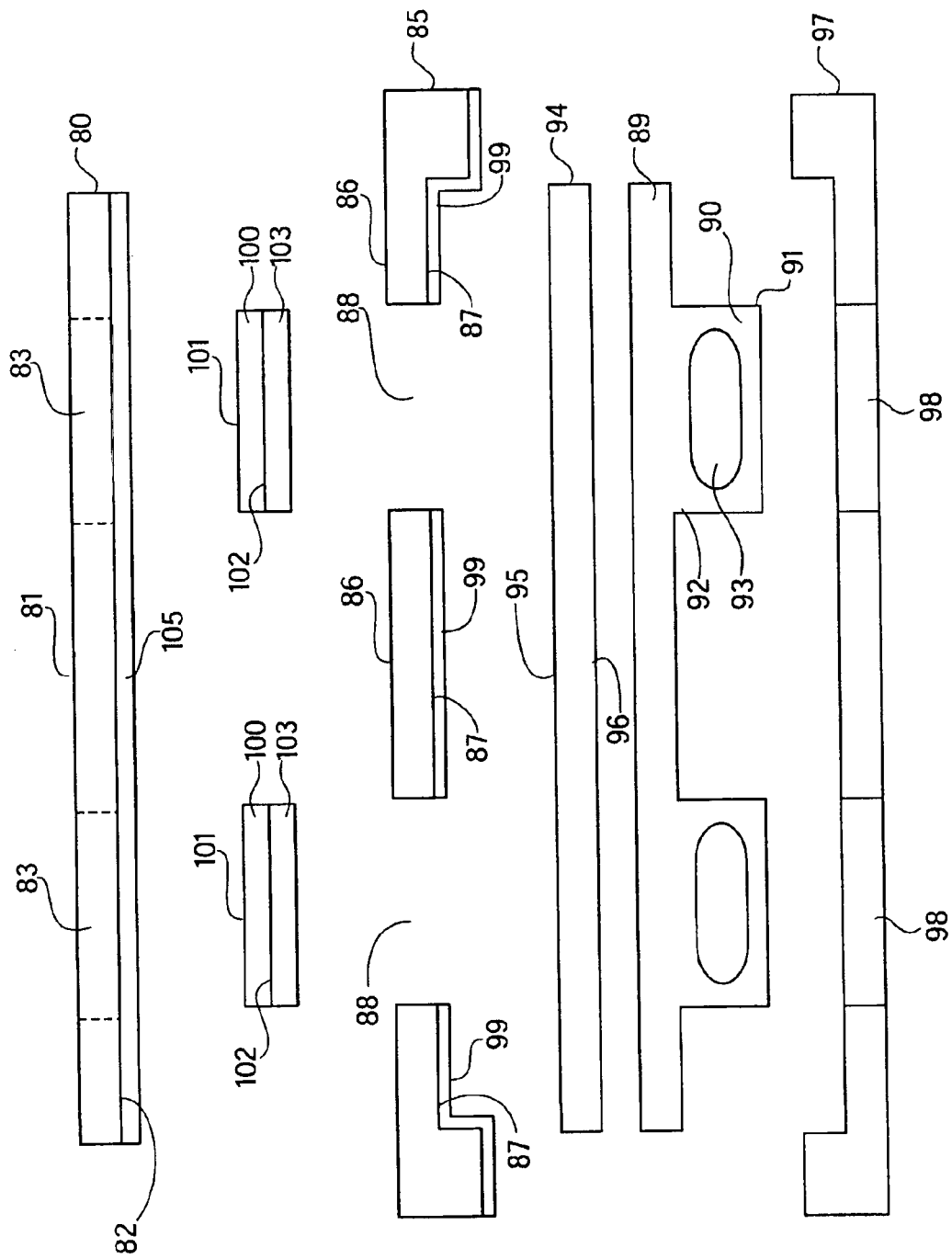
FIG. 21 shows an alternate embodiment of the invention shown in FIG. 17.

FIG. 21 shows another especially preferred alternative embodiment of the embodiment shown in FIG. 17 in which a film material 100, preferably clear, is disposed between the first sheet and the second sheet. The film material 100, preferably a clear sheet, has a first major surface 101 and a second major surface 102. A removable adhesive 103 is applied to the second major surface 102 of the film material 100. In this embodiment, the second major surface 82 of the first sheet 80 is provided with a permanent adhesive 105.

FIG. 21 is an exploded view and shows a first sheet 80 having a first major surface 81 and a second major surface 82 and a plurality of selectively removable portions 83. The second major surface 82 is provided with a permanent adhesive 105. A second sheet 85 has a first major surface 86 and a second major surface 87 and is provided with a plurality of apertures 88. A film material 100, preferably clear, is disposed between the first sheet 80 and the second sheet 85. The film material 100, preferably a clear sheet, has a first major surface 101 and a second major surface 102. A removable or temporary adhesive 103 is applied to the second major surface 102 of the film material 100. In a preferred embodiment the film material 100 does not cover the entire second major surface 82 of the first sheet 80. In an especially preferred embodiment, the first and second major surfaces 101 and 102 of the film material 100 have an area that is smaller than the area of the second major surface 82 of the first sheet 80 and the sheet material 100 is sized and disposed so as to leave a border of uncovered permanent adhesive 104 around the border of the second major surface 82 of the first sheet 80. This permits a portion of the first sheet 80 to be permanently adhered to the first major surface 86 of the second sheet 85.

The first major surface 86 of the second sheet 85 is attached to the second major surface 102 of the film material 100. The first major surface 86 of the second sheet 85 is attached to the second major surface 82 of the first sheet 80. The second major surface 87 of the second sheet 85 is provided with a permanent adhesive 99. A blister package 89 has a plurality of medicament compartments 90 with each of the plurality of compartments 90 having a closed bottom end 91 and an open top end 92 for receiving a medicament 93. A medicament containment sheet 94 has a first major surface 95 and a second major surface 96. The second major surface 96 of the containment sheet 94 is attached to the blister card 89 and the first major surface 95 of the containment sheet 94 is attached to the permanent adhesive 99 on the second major surface 87 of the second sheet 85. The removable portions 83 of the first sheet 80 are in registry with the open top ends 92 of the medicament compartments 90 and are also in registry with the apertures 88 in the second sheet 85. The temporary or removable adhesive 103 on the second major surface 102 of the film material 100 has an adhesive strength that is sufficient to adhere the first sheet 80 to the first major surface 86 of the second sheet 85 and adhere the first sheet 80 to the first major surface 95 of the medicament containment sheet 94, and an adhesive strength that allows the selectively removable portions 83 in the first sheet 80 to be removed without removing the portions of the medicament containment sheet 94 covering the open top end 92 of the medicament compartment 90 to which the first sheet 80 is attached. In a preferred embodiment, a third sheet 97 may be provided to impart stability. The third sheet 97 is provided with a plurality of apertures 98 sized and aligned to receive the medicament compartments 90. The second sheet 85 and third sheet 97 may be two separate sheets or, alternatively, the second sheet 85 and the third sheet 97 may be hingedly connected in a clam shell configuration as previously discussed.

In a preferred embodiment, the first sheet is comprised of paper or a synthetic material. The second sheet is preferably a synthetic material. The blister card may also be provided with means to facilitate selective removal of the removable portions of the first sheet (e.g., a tab attached to each removable portion). In a preferred embodiment the means is selected from the group consisting of slits, notches, and perforations. The medicament containing sheet may be transparent or opaque and in a preferred embodiment is comprised of a metal foil.

Figure 22:
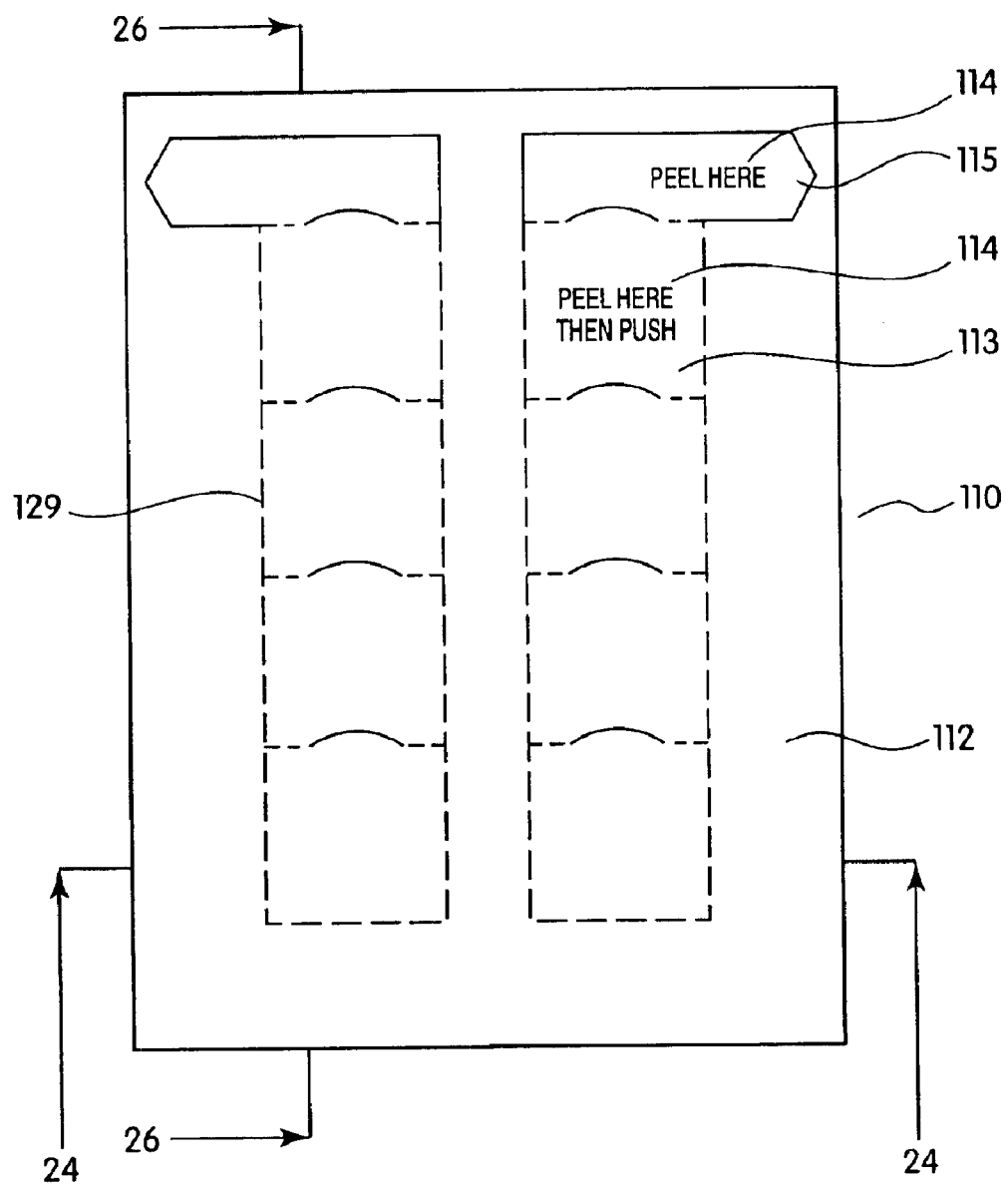
FIG. 22 is a top view of a label constructed in accordance with the invention.

FIGS. 22 to 27 show another alternative embodiment of the invention. FIG. 22 is a top view of another preferred embodiment of a label or first sheet 110 constructed in accordance with the invention. As shown best in FIG. 24, the label 110 has a first major surface 111. The label 110 may optionally be provided with non-removable portions 112 having a first major surface 111', and removable portions 113 having a first major surface 111". The first major surface 111" of removable portions 113 may optionally be provided with identification indicia 114. A removable label facilitation tab 115 may be provided to facilitate access to the removable portions 113 of the label 110. The tab 115 may also be provided with indicia 114.

Figure 23:
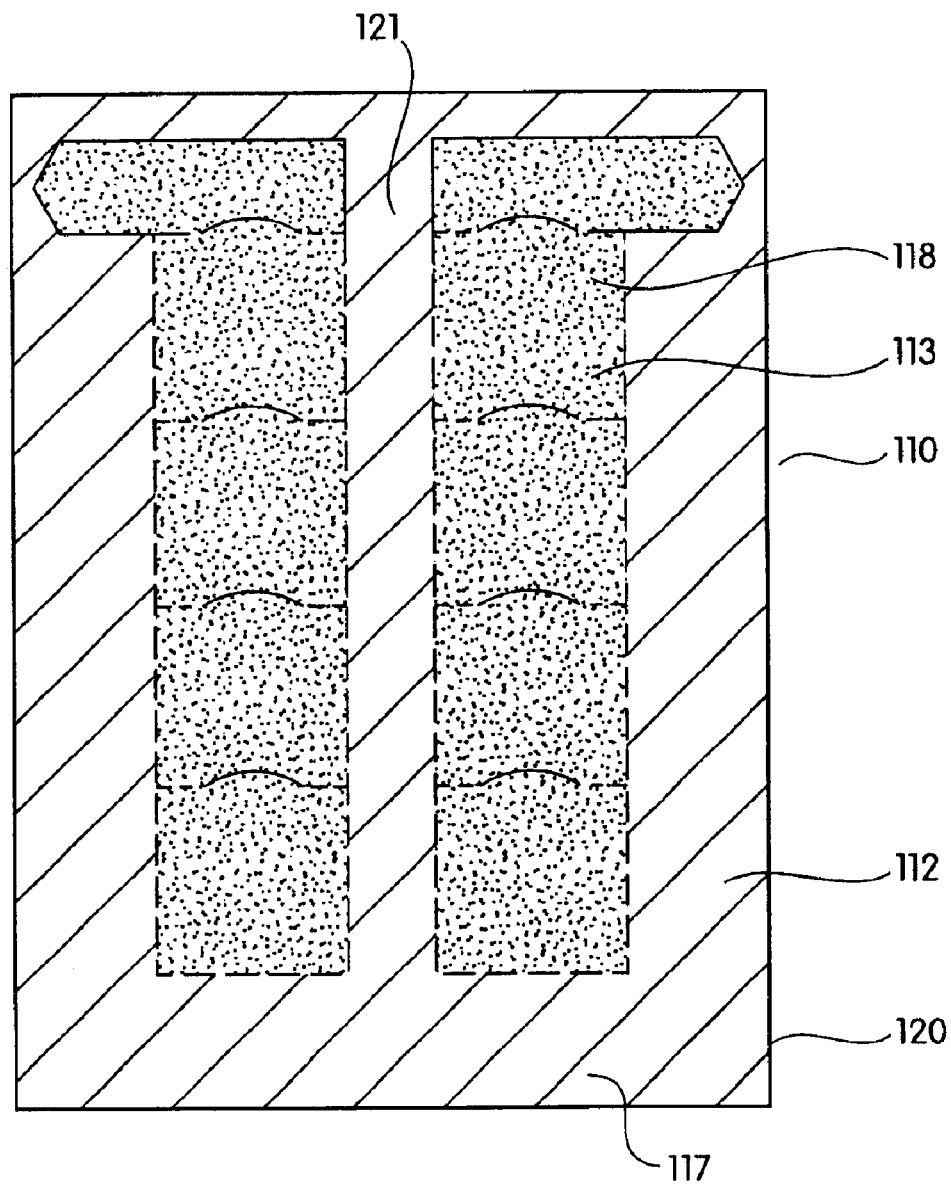
FIG. 23 is a bottom view of FIG. 22.

FIG. 23 is a bottom view of the label 110 shown in FIG. 22 and shows the second major surface 116 of the label or first sheet 110, non-removable portions 112 having a second major surface 116', and removable portions 113 having a second major surface 116". As discussed in more detail below, the second major surface 116' of the non-removable portions 112 is provided with a directly applied permanent adhesive 117 and the second major surface 116" of the removable portions 113 is provided with a directly applied temporary or removable adhesive 118. The label 110 shown in FIGS. 22 and 23 may be applied to a blister package 119 as discussed below and as shown in FIGS. 24 to 27.

Figure 24:
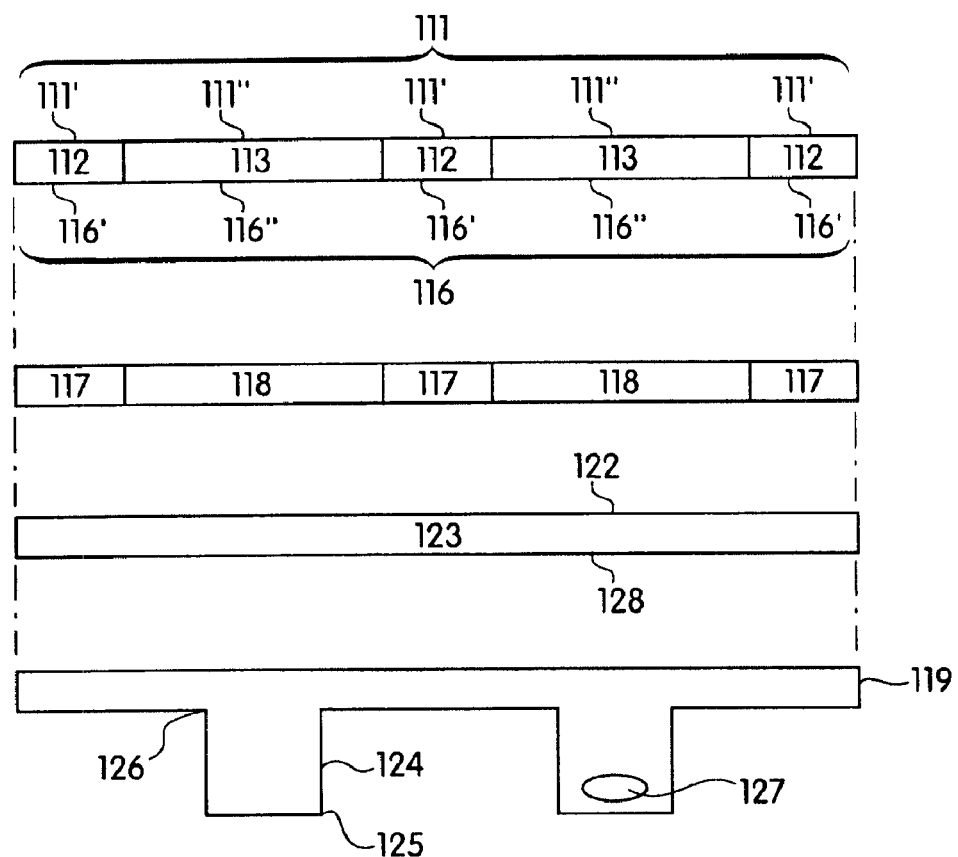
FIG. 24 is an exploded end-view of an alternate embodiment taken along line 24—24 of FIG. 22.
Figure 25:
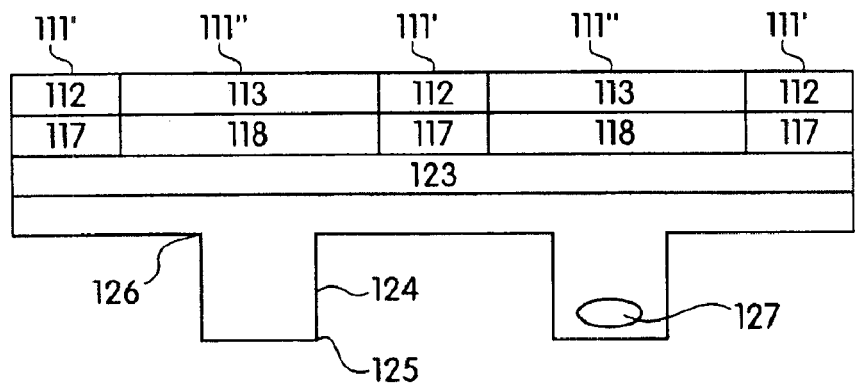
FIG. 25 shows the components of FIG. 24 after they have been assembled.
Figure 26:
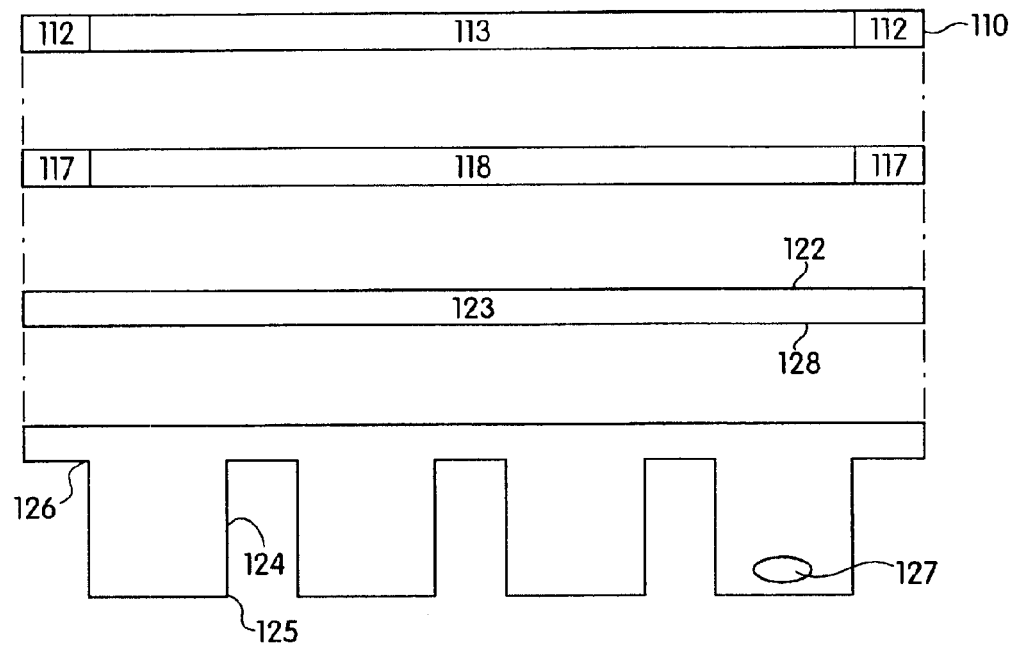
FIG. 26 is an exploded side-view taken along line 26—26 of FIG. 22.
Figure 27:
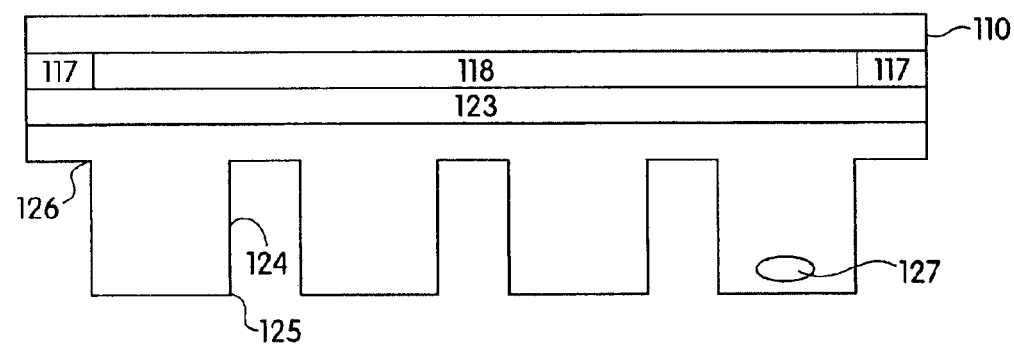
FIG. 27 shows the components of FIG. 26 after they have been assembled.

FIG. 24 is an exploded end-view of the components of a label and blister package constructed in accordance with the invention taken along line 24—24 of FIG. 22. FIG. 25 shows the components shown in FIG. 24 after they have been assembled. FIG. 26 is an exploded side-view taken along line 26—26 of FIG. 22. FIG. 27 shows the components shown in FIG. 26 after they have been assembled. As shown in FIGS. 22 to 27, the first sheet 110 is provided with a first major surface 111 and a second major surface 116 and a plurality of selectively removable portions 113. The second major surface 116' of the non-removable portions 112 is provided with a permanent adhesive 117. A removable or temporary adhesive 118 is applied to the second major surface 116" of the removable portions 113 of the label 110. In an especially preferred embodiment, the permanent adhesive 117 is disposed so as to leave a perimeter or border 120 of permanent adhesive 117 around the border of the second major surface 116 of the sheet 110, and optionally, also along the longitudinal midline 121 of the second major surface 116 of the first sheet 110 to define a non-removable second surface 116' of the first sheet 110 as shown best in FIG. 23. This permits a portion of the second major surface 116 of the first sheet 110 to be permanently adhered to the first major surface 122 of the medicament containment sheet 123. The temporary adhesive 118 is disposed between the permanent adhesive 117 disposed on the border 120 and the longitudinal midline 121 of the second major surface of the sheet 110. A blister package 119 has a plurality of medicament compartments 124 with each of the plurality of compartments 124 having a closed bottom end 125 and an open top end 126 for receiving a medicament 127. A medicament containment sheet 123 has a first major surface 122 and a second major surface 128. Portions of the second major surface 128 of the containment sheet 123 are attached to the blister package 119 and the first major surface 122 of the containment sheet 123 is-permanently attached to the permanent adhesive 117 on the second major surface 116' of the first sheet 110. The removable portions 113 of the first sheet 110 are in registry with the open top ends 126 of the medicament compartments 124. The temporary or removable adhesive 118 on the second major surface 116" of the first sheet 110 has an adhesive strength that is sufficient to temporarily adhere the second major surface 116" of the first sheet 110 to the first major surface 122 of the medicament containment sheet 123, and an adhesive strength that allows the selectively removable portions 113 in the first sheet 110 to be removed without removing the portions of the medicament containment sheet 123 covering the open top end 126 of the medicament compartment 124 to which the second major surfaces 116" of the removable portions 113 of the first sheet 110 are attached.

In a preferred embodiment, the first sheet 110 is comprised of paper or a synthetic material that is suitable for being provided with at least one, and preferably a plurality, of selectively removable portions 113 utilizing means well known to those skilled in the art. The first sheet 110 may also be provided with means 129 to facilitate selective removal of the removable portions 113 of the first sheet 110 (e.g., a tab attached to each removable portion). In a preferred embodiment the means 129 is selected from the group consisting of slits, notches, and perforations. The medicament containment sheet 123 may be transparent or opaque and in a preferred embodiment is comprised of a metal foil.

Figure 28:
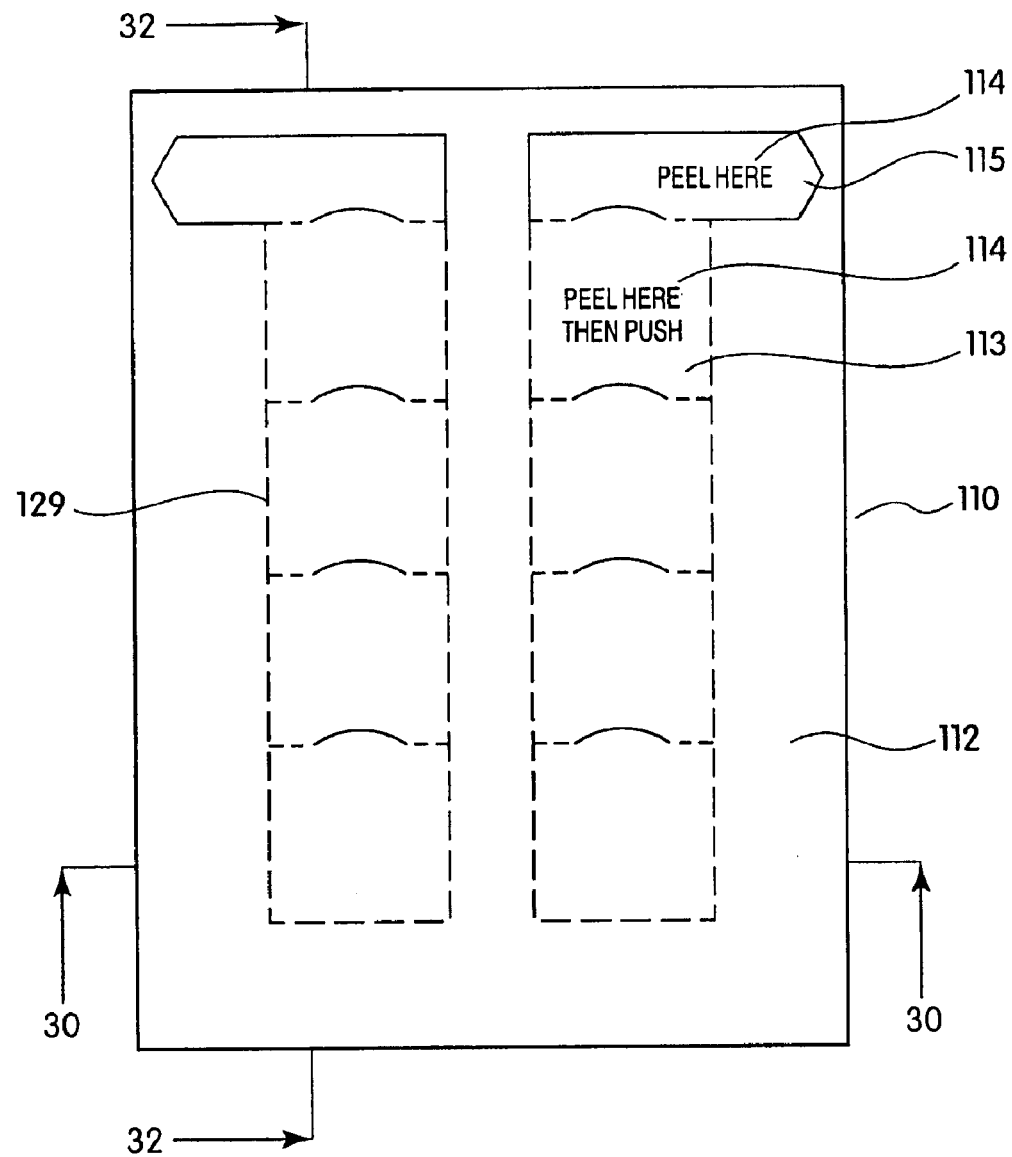
FIG. 28 is a top view of a label constructed in accordance with the invention.

FIGS. 28 to 33 show yet another preferred alternative embodiment of the invention. FIG. 28 is a top view of another preferred embodiment of a label or first sheet 110 constructed in accordance with the invention. As shown best in FIG. 30, the label 110 has a first major surface 111. The label 110 may optionally be provided with non-removable portions 112 having a first major surface 111', and removable portions 113 having a first major surface 111". The first major surface 111" of removable portions 113 may optionally be provided with identification indicia 114. A removable label facilitation tab 115 may be provided to facilitate access to the removable portions 113 of the label or first sheet 110 and may also be provided with indicia 114.

Figure 29:
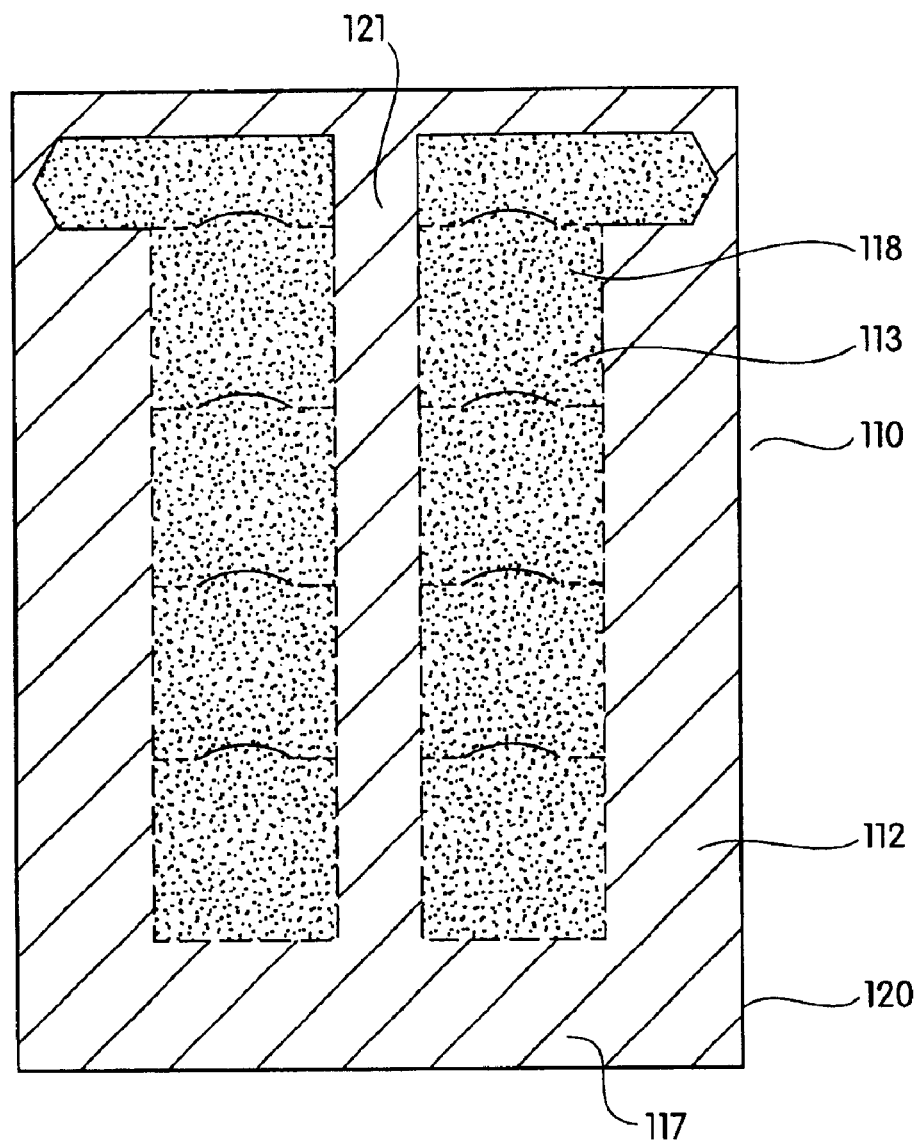
FIG. 29 is a bottom view of FIG. 28.

FIG. 29 is a bottom view of the label 110 shown in FIG. 28 and shows the second major surface 116 of the label or first sheet 110, non-removable portions 112 having a second major surface 116', and removable portions 113 having a second major surface 116". As discussed in more detail below, the second major surface 116' of the non-removable portions 112 is provided with a directly applied permanent adhesive 117 and the second major surface 116" of the removable portions 113 is provided with a directly applied temporary or removable adhesive 118. The label 110 shown in FIGS. 28 and 29 may be applied to a blister package 119 as discussed below and as shown in FIGS. 30 to 33.

Figure 30:
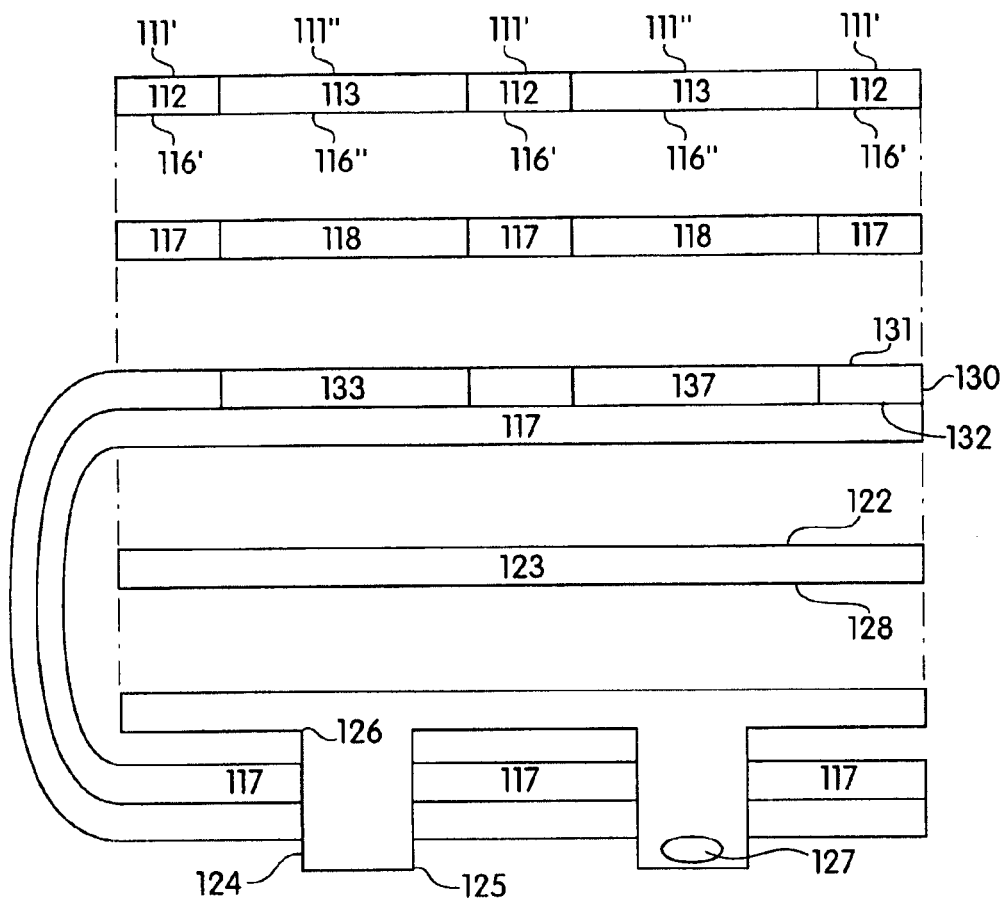
FIG. 30 is an exploded end-view of an alternate embodiment taken along line 30—30 of FIG. 28.
Figure 31:
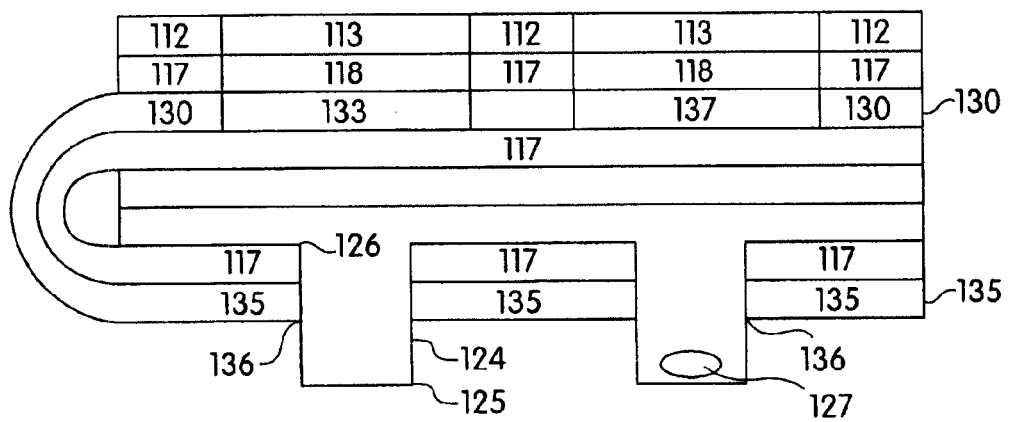
FIG. 31 shows the components of FIG. 30 after they have been assembled.
Figure 32:
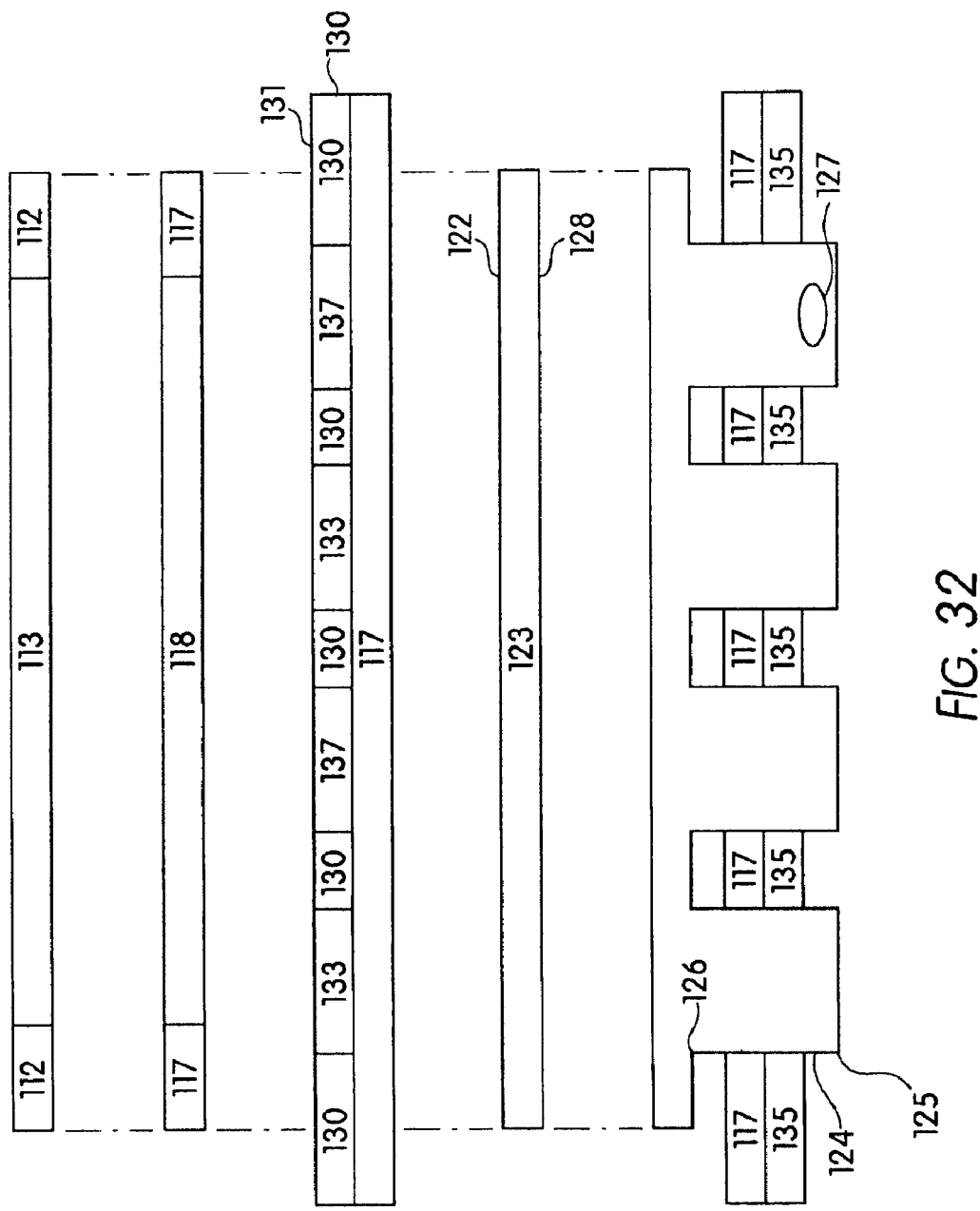
FIG. 32 is an exploded side-view taken along line 32—32 of FIG. 28.
Figure 33:
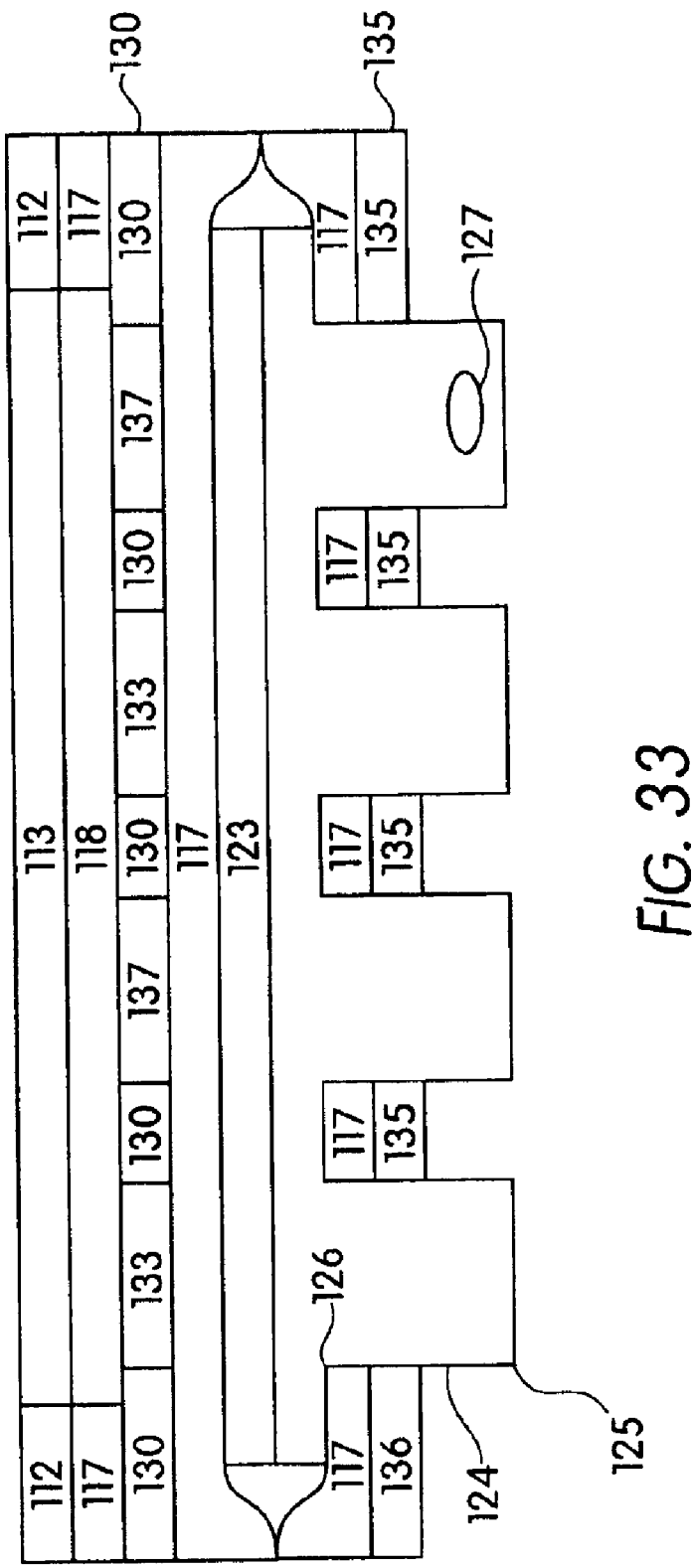
FIG. 33 shows the components of FIG. 32 after they have been assembled.

FIG. 30 is an exploded end-view of the components of a label and blister card constructed in accordance with the invention taken along line 30—30 of FIG. 28. FIG. 31 shows the components shown in FIG. 30 after they have been assembled. FIG. 32 is an exploded side-view taken along line 32—32 of FIG. 28. FIG. 33 shows the components shown in FIG. 32 after they have been assembled. As shown in FIGS. 28–33, the first sheet 110 is provided with a first major surface 111 and a second major surface 116 and a plurality of selectively removable portions 113. The second major surface 116' of the non-removable portions 112 is provided with a permanent adhesive 117. A removable or temporary adhesive 118 is applied to the second major surface 116" of the removable portions 113 of the label 110. In an especially preferred embodiment, the permanent adhesive 117 is disposed so as to leave a border 120 of permanent adhesive 117 around the border 120 of the second major surface 116 of sheet 110 to define a non-removable second surface 116' of the first sheet 110, and optionally, also along the longitudinal midline 121 of the second major surface 116 of the first sheet 110 as shown best in FIG. 29. The temporary adhesive 118 is disposed between the portions of the permanent adhesive 117 disposed on the border 120 and the longitudinal midline 121 of the second major surface of the sheet 110. A second sheet or card 130 may be utilized to impart additional stiffening or rigidity and has a first major surface 131 and a second major surface 132 and may be provided with a plurality of apertures 133. These apertures 133 may be left open or may be provided with removable portions 137 to impart additional safety to the packaging by requiring an additional step, i.e., the removal of the removable portions 137 in order to have access to the medicament 127. The removable portions 137 may be removed by pushing the medicament against the second major surface 132 of the removable portions 137 as previously discussed. For the purposes of ease of illustration, the second sheet 130 is shown as having both open apertures 133 and removable portions 137 blocking or plugging some of the apertures 133. In a preferred embodiment, sheet 130 would be provided with either all open apertures 133 or with removable portions 137 blocking or plugging all of the apertures 133 as specific medicament dispensing applications dictate.

The first major surface 131 of the second sheet 130 is permanently attached to the second major surface 116' of the first sheet 110 and in an especially preferred embodiment is attached to the permanent adhesive 117 disposed around the border 120 and the longitudinal midline 121. The second major surface 132 of the second sheet 130 is provided with a permanent adhesive 117. This permits a portion of the second sheet 130 to be permanently adhered to the first major surface 122 of the medicament containing sheet 123. A blister package 119 has a plurality of medicament compartments 124 with each of the plurality of compartments 124 having a closed bottom end 125 and an open top end 126 for receiving a medicament 127. A medicament containment sheet 123 has a first major surface 122 and a second major surface 128. The second major surface 128 of the containment sheet 123 is attached to the blister package 119 and the first major surface 122 of the containment sheet 123 is attached to the permanent adhesive 117 on the second major surface 132 of the second sheet 130. The removable portions 113 of the first sheet 110 are in registry with the open top ends 126 of the medicament compartments 124 and are also in registry with the apertures 133 or removable portions 137 in the second sheet 130. The temporary or removable adhesive 118 on the second major surface 116" of the first sheet 110 has an adhesive strength that is sufficient to temporarily adhere the second major surface 116" of the first sheet 110 to the first major surface 131 of the second sheet 130, and an adhesive strength that allows the selectively removable portions 113 in the first sheet 110 to be removed without removing the removable portions 134, if present, of the second sheet 130 attached to the medicament containment sheet plugging the apertures 133 in the second sheet 130. In the embodiment in which the apertures 133 are not provided with removable portions 137 plugging the apertures 133, the removable adhesive 118 on the second major surface 116" of the removable portions 113 may protrude through aperture 133 and may contact and be temporarily attached to the first major surface 122 of the medicament containment sheet. The removable adhesive 118 has an adhesive strength that allows the removable portions 113 to be selectively removed from the first major surface 122 of the medicament containment sheet 123 without removing any portion of the medicament containment sheet 123 covering the open top end 126 of the medicament compartment 124.

In a preferred embodiment, a third sheet or card 135 may be provided to impart stability. The third sheet 135 is provided with a plurality of apertures 136 sized and aligned to receive the medicament compartments 124. The second sheet 130 and third sheet 135 may be two separate sheets or, alternatively, the second sheet 130 and the third sheet 135 may be hingedly connected in a clam shell configuration as previously discussed.

In a preferred embodiment, the first sheet is comprised of paper or a synthetic material that is suitable for being provided with at least one, and preferably a plurality of selectively removable portions 113. The blister card may also be provided with means to facilitate selective removal of the removable portions of the first sheet (e.g., a tab attached to each removable portion). In a preferred embodiment the means is selected from the group consisting of slits, notches, and perforations. The medicament containing sheet may be transparent or opaque and in a preferred embodiment is comprised of a metal foil.

What is claimed is:

1. A child resistant/senior friendly blister package, comprising:
    (a) a first sheet having a first major surface and a second major surface and a plurality of selectively removable portions, the second major surface of the removable portions provided with a directly applied temporary adhesive, the second major surface of the non-removable portions provided with a directly applied permanent adhesive;

(b) a second sheet having a first major surface and a second major surface and a plurality of removable portions, the first major surface of the second sheet attached to the second major surface of the first sheet, the second major surface of the second sheet provided with a permanent adhesive;

(c) a blister package having a plurality of medicament compartments, each of the plurality of compartments having a closed bottom end and an open top end for receiving a medicament;

(d) a medicament containment sheet having a first major surface and a second major surface, portions of the second major surface of the containment sheet attached to the blister package and portions of the first major surface of the containment sheet permanently attached to the permanent adhesive on the second major surface of the second sheet; and (e) wherein the removable portions of the first sheet are in registry with the open top ends of the medicament compartments and are in registry with the removable portions of the second sheet, and wherein the permanent adhesive on the second major surface of the first sheet has an adhesive strength that is sufficient to permanently adhere the first sheet to the first major surface of the second sheet and wherein the temporary adhesive on the second major surface of the removable portions of the first sheet have an adhesive strength that allows the selectively removable portions of the first sheet to be removed from the second sheet without removing the selectively removable portions of the second sheet to which the first sheet is attached.

2. The blister package of claim 1, wherein the first sheet is paper.

3. The blister package of claim 1, wherein the first sheet is a synthetic material.

4. The blister package of claim 1, wherein the second sheet is a synthetic material.

5. The blister package of claim 1, further comprising removal facilitation notches to facilitate the selective removal of the removable portions of the first sheet.

6. The blister package of claim 1, wherein the medicament containing sheet is transparent.

7. The blister package of claim 1, further comprising a tab attached to each removable portion.

8. The blister package of claim 7, further comprising means to facilitate selective removal of the removable portions.

9. The blister package of claim 7, wherein the means is selected from the group consisting of slits and perforations.

10. A child resistant/senior friendly blister package, comprising:

(a) a first sheet having a first major surface and a second major surface and a plurality of selectively removable portions, the second major surface of the removable portions provided with a directly applied temporary adhesive, and the second major surface of the non-removable portions provided with a directly applied permanent adhesive;

(b) a second sheet having a first major surface and a second major surface and provided with a plurality of apertures, the first major surface of the second sheet attached to the second major surface of the first sheet, the second major surface of the second sheet provided with a permanent adhesive;

(c) a blister package having a plurality of medicament compartments, each of the plurality of compartments having a closed bottom end and an open top end for receiving a medicament;

(d) a medicament containment sheet having a first major surface and a second major surface, the second major surface of the containment sheet attached to the blister package and the first major surface of the containment sheet attached to the permanent adhesive on the second major surface of the second sheet; and (e) wherein the removable portions of the first sheet are in registry with the open top ends of the medicament compartments and also in registry with the apertures in the second sheet, and wherein the permanent adhesive disposed on the second major surface of the first sheet has an adhesive strength that is sufficient to permanently adhere the first sheet to the first major surface of the second sheet, and wherein the temporary adhesive disposed on the second major surface of the removable portions has an adhesive strength that allows the selectively removable portions of the first sheet to be removed from the first sheet without removing the portions of the medicament containment sheet covering the open top end of the medicament compartment to which the first sheet is attached.

11. The blister package of claim 10, wherein the first sheet is paper.

12. The blister package of claim 10, wherein the first sheet is a synthetic material.

13. The blister package of claim 10, wherein the second sheet is a synthetic material.

14. The blister package of claim 10, further comprising removal facilitation notches to facilitate the selective removal of the removable portions of the first sheet.

15. The blister package of claim 10, wherein the medicament containing sheet is transparent.

16. The blister package of claim 10, further comprising a tab attached to each removable portion.

17. The blister package of claim 16, further comprising means to facilitate selective removal of the removable portions.

18. The blister package of claim 16, wherein the means is selected from the group consisting of slits and perforations.

19. A child resistant/senior friendly blister package, comprising:

(a) a first sheet having a first major surface and a second major surface and a plurality of selectively removable portions, the second major surface of the removable portions provided with a directly applied temporary adhesive, and the second major surface of the non-removable portions provided with a directly applied permanent adhesive;

(b) a blister package having a plurality of medicament compartments, each of the plurality of compartments having a closed bottom end and an open top end for receiving a medicament;

(c) a medicament containment sheet having a first major surface and a second major surface, the second major surface of the containment sheet attached to the blister package and the first major surface of the containment sheet permanently attached to the permanent adhesive on the second major surface of the first sheet;

(d) wherein the removable portions of the first sheet are in registry with the open top ends of the medicament compartments, and wherein the temporary adhesive on the second major surface of the removable portions on the first sheet has an adhesive strength that is sufficient to temporarily adhere the second major surface of the removable portions of the first sheet to the first major surface of the medicament containment sheet, and an adhesive strength that allows the selectively removable portions of the first sheet to be removed without removing the portions of the medicament containment sheet covering the open top end of the medicament compartment to which the removable portions of first sheet are attached.

20. The blister package of claim 19, wherein the first sheet is paper.

21. The blister package of claim 19, wherein the first sheet is a synthetic material.

22. The blister package of claim 19, further comprising removal facilitation notches to facilitate the selective removal of the removable portions of the first sheet.

23. The blister package of claim 19, wherein the medicament containing sheet is transparent.

24. The blister package of claim 19, further comprising a tab attached to each removable portion.

25. The blister package of claim 24, further comprising means to facilitate selective removal of the removable portions.

26. The blister package of claim 24, wherein the means is selected from the group consisting of slits and perforations.

* * * * *